(12) United States Patent
Sato et al.

(10) Patent No.: US 7,266,108 B2
(45) Date of Patent: *Sep. 4, 2007

(54) METHOD AND APPARATUS FOR RECEIVING DIVERSITY SIGNALS FOR USE IN OFDM RADIO COMMUNICATION SYSTEM

(75) Inventors: Kazumi Sato, Kanagawa-ken (JP); Minoru Namekata, Kanagawa-ken (JP)

(73) Assignee: Kabushiki Kaisha Toshiba, Kawasaki-shi (JP)

(*) Notice: Subject to any disclaimer, the term of this patent is extended or adjusted under 35 U.S.C. 154(b) by 1105 days.

This patent is subject to a terminal disclaimer.

(21) Appl. No.: 10/271,546

(22) Filed: Oct. 17, 2002

(65) Prior Publication Data
US 2003/0058786 A1    Mar. 27, 2003

Related U.S. Application Data

(63) Continuation of application No. 09/226,721, filed on Jan. 7, 1999, now Pat. No. 6,628,638.

(30) Foreign Application Priority Data

Jan. 8, 1998  (JP)  .............................. 10-002509

(51) Int. Cl.
*H04J 1/02* (2006.01)
*H04J 11/00* (2006.01)

(52) U.S. Cl. ........................ 370/343; 370/203; 375/347

(58) Field of Classification Search ................ 370/343, 370/480, 492, 310, 315, 203; 379/347; 375/347
See application file for complete search history.

(56) References Cited

U.S. PATENT DOCUMENTS 4,969,207 A    11/1990  Sakamoto et al.

(Continued)

FOREIGN PATENT DOCUMENTS

JP    9-172427    6/1997
JP    9-284191    10/1997

OTHER PUBLICATIONS

S. Bulumulla, S. Kassam, and S. Venkatesh, "An Adaptive Diversity Receiver for OFDM in Fading Channels," 1998, IEEE, pp. 1325-1329.

(Continued)

*Primary Examiner*—Min Jung
(74) *Attorney, Agent, or Firm*—Finnegan, Henderson, Farabow, Garrett & Dunner, L.L.P.

(57) ABSTRACT

A diversity receiving apparatus for use in an OFDM transmission radio communication/broadcasting system where OFDM signals are received by a plurality of antennas and input into a plurality of receivers. The OFDM received signals are further transformed into frequency spectra. Channel frequency responses are calculated by using OFDM received signal frequency spectra and a reference frequency spectrum generated in a reference spectrum generator. OFDM received signal frequency spectra distortions are compensated by using corresponding channel frequency responses. The transformed OFDM received signal frequency spectra are input into a selector unit as first input signals, while the distortion-compensated OFDM received signal frequency spectra are input into the selector unit as second input signals. The selector unit then selects a second input signal corresponding to a first input signal having maximum amplitude or maximum power. A demodulator then demodulates the output signal of the selector unit into a digital signal sequence.

26 Claims, 14 Drawing Sheets

U.S. PATENT DOCUMENTS

| | | |
|---|---|---|
| 5,203,027 A | 4/1993 | Nounin et al. |
| 5,282,222 A | 1/1994 | Fattouche et al. |
| 5,291,519 A | 3/1994 | Tsurumaru |
| 5,487,069 A | 1/1996 | O'Sullivan et al. |
| 5,867,478 A | 2/1999 | Baum et al. |
| 5,914,933 A | 6/1999 | Cimini et al. |
| 5,949,796 A | 9/1999 | Kumar |
| 6,188,669 B1 | 2/2001 | Bellenger |
| 6,219,334 B1 | 4/2001 | Sato et al. |
| 6,246,698 B1 | 6/2001 | Kumar |
| 6,249,250 B1 | 6/2001 | Namekata et al. |
| 6,298,035 B1 | 10/2001 | Heiskala |
| 6,327,314 B1 | 12/2001 | Cimini, Jr. et al. |
| 6,628,638 B1 * | 9/2003 | Sato et al. .................. 370/343 |

OTHER PUBLICATIONS

M. Alard, R. Helbert, B. Floch, and D. Pommier, "A New System of Sound Broadcasting to Mobile Receivers," 1988, IEEE, pp. 416-420.

W. Zou, and Y. Wu, "COFDM: An Overview," 1995, IEEE, pp. 1-8.

A. Chini, Y. Wu, M. El-Tanany, and S. Mahmound, "Filtered Decision Feedback Channel Estimation of OFDM-Based DTV Terrestrial Broadcasting System," 1998, IEEE, pp. 2-11.

J. Gledhil, S. Anikhindi, and P. Avon, The Transmission of Digital Television in the UHF Band Using Orthogonal Frequency Division Multiplexing, pp. 175-180.

J. Linnartz and A. Gorokhov, "New Equalization Approach for OFDM Over Dispersive and Rapidly Time Varying Channel," 2000, IEEE, pp. 1375-1379.

* cited by examiner

METHOD AND APPARATUS FOR RECEIVING DIVERSITY SIGNALS FOR USE IN OFDM RADIO COMMUNICATION SYSTEM

This application is a continuation of application Ser. No. 09/226,721, filed on Jan. 7, 1999, now U.S. Pat. No. 6,628,638, which is hereby expressly incorporated herein by reference.

BACKGROUND OF THE INVENTION

1. Field of the Invention

The present invention generally relates to an orthogonal frequency division multiplexing (OFDM) receiving apparatus for use in a base station or a terminal station of a radio communication system that performs OFDM radio transmission, or to an OFDM receiving apparatus for use in a receiving station of an OFDM broadcasting system. More particularly, the invention relates to an OFDM diversity receiving apparatus that implements high-quality information transmission even under a poor radio propagation environment.

2. Description of the Background

Terrestrial television broadcasting currently use analog signals. There are plans, however, in about the year 2000, for analog signals to be replaced by digital signals in terrestrial television broadcasting. In terrestrial television broadcasting, the area covered by a single transmission station is very large. A serious problem thus encountered is that multiple reflection wave transmission (multipath) occurs in propagating radio waves, thus degrading image quality. This is referred to as "ghost interference". The scale of the multipath in terrestrial television broadcasting is much greater than that occurring in radio communication system, such as mobile cellular telephones. Even using an adaptive equalizer, which should be effective as a countermeasure against multipath, the multipath in terrestrial television broadcasting can no longer be handled.

In view of the above background, the OFDM transmission method, which is, in principle, resistant even under a poor multipath transmission environment and achieves high-quality information transmission, is to be employed as a digital transmission method for terrestrial television broadcasting. An OFDM transmission signal is provided with a guard interval in which part of a transmission waveform (symbol) is copied. The guard interval accommodates multipath propagation which is shorter than the length of the guard interval, thereby preventing fatal degradation of the image quality.

There are high expectations that the above-described multipath-resistant transmission characteristics of the OFDM transmission method will be used not only in terrestrial television broadcasting, but also in wide-area radio communication systems, such as multimedia communications, which are to be widely performed in public networks. Accordingly, a technical study of the practical application of the above OFDM transmission method is actively in progress.

Additionally, according to the OFDM transmission method, by virtue of the multipath-resistant transmission characteristics, a single frequency network (SFN) in which the same information is simultaneously transmitted with the same frequency can be constructed. This makes it possible to prevent wasteful use of a frequency, and more specifically, to prevent the transmitting frequency from being changed according to the area, which is conventionally required. In terms of compressing a frequency band for use, the OFDM transmission method is very effective.

However, even though the OFDM transmission method exhibits excellent multipath-resistant transmission characteristics, the receiving characteristics cannot be perfectly maintained because of severe frequency selective fading caused by multipath propagation, or Doppler shift and time fading occurring while a receiving end is moving.

High-definition image transmission is strongly expected to be achieved in digital terrestrial television broadcasting and the next-generation multimedia communications. Particularly in this type of transmission, there is a demand for a radio transmission technique which is much more stable and which exhibits higher quality transmission than that being used in current mobile cellular telephones, in which sound communications rather than image communications are the mainstream. Accordingly, the advent of a receiving method and a receiving apparatus that exhibit higher-quality receiving characteristics is greatly needed.

High-definition images having a large amount of information are required to be transmitted in a narrow radio band in order to effectively and efficiently use the frequency band. It is thus necessary to consider the use of a high-efficiency modulation method, such as a multilevel quadrature amplitude modulation (QAM), under a mobile radio propagation environment. However, a high-efficiency modulation method represented by QAM has poor noise-resistant characteristics and interference-resistant characteristics, and is also vulnerable to distortions.

In a receiving apparatus positioned far from a transmission station or a base station, or in a receiving apparatus receiving signals while it is moving, the received signals have a low signal-to-noise (S/N) ratio or have a propagation distortion. This easily causes degradation of receiving characteristics and consequent, failure to transmit information with a satisfactory quality. This problem becomes serious particularly for terrestrial television broadcasting that covers a very wide area. Accordingly, an effective improvement in the transmission method is required.

A typical measure being taken for improving the receiving characteristics under a severe multiple radio propagation environment or under a poor mobile receiving environment is diversity reception. As a diversity reception method, antenna selection diversity reception is primarily used in which digital signal sequences are demodulated by selecting from a plurality of receiving antennas the receiving antenna having the maximum radio frequency (RF) signal power.

In the OFDM transmission method, however, a received signal is frequency-converted into a baseband signal, which is further converted into frequency spectra in units of symbols. A digital signal sequence is then demodulated from each line spectrum which forms a frequency spectrum. Thus, the antenna selection diversity reception that changes antennas by RF signals is not very effective on the OFDM transmission method. Particularly upon generation of severe frequency selective fading, the receiving characteristics are completely different according to the line spectrum which forms a frequency spectrum. Thus, there is an increasing demand for selection diversity that obtains optimal receiving characteristics for each line spectrum.

As discussed above, in a radio communication/broadcasting system for transmitting digital signal sequences by using the OFDM method, it is necessary to transmit high-quality and high-definition information in all the places within a wide area covered by this system while effectively utilizing the multipath-resistant transmission characteristics of the OFDM transmission method. To satisfy the above requirements, it is further necessary to inhibit the degradation of the receiving characteristics under a severe multiple reflection wave propagation (multipath) environment and to suppress the degradation of the receiving characteristics while a receiving apparatus is moving.

In particular, in future multimedia communications and digital terrestrial broadcasting, in which image transmission is to become the mainstream, the application of a high-efficiency modulation method, such as multilevel QAM, will be essential. Thus, there is an increasing demand for an improvement in the receiving characteristics in the OFDM transmission method, in particular, for the development of an OFDM diversity receiving apparatus that exhibits good receiving characteristics even in response to frequency selective fading.

SUMMARY OF THE INVENTION

It is therefore an object of the present invention to provide an OFDM diversity receiving apparatus for use in an OFDM radio communication/broadcasting system that suppresses the degradation of the receiving characteristics under a multiple reflection wave propagation environment or under a moving reception environment.

To achieve the above object, the present invention provides a diversity receiving apparatus for use in a radio communication system that uses an OFDM technique. The diversity receiving apparatus includes a plurality of diversity branches. Each of the diversity branches has a receiver for receiving an OFDM signal via an antenna and outputting the OFDM received signal, a first transformer for transforming the OFDM received signal into a frequency spectrum and outputting the OFDM received signal frequency spectrum, and a channel frequency response calculating unit for calculating a channel frequency response in accordance with the OFDM received signal frequency spectrum and a reference frequency spectrum. A selector unit selects the diversity branch that has generated the OFDM received signal frequency spectrum having a maximum amplitude or a maximum power.

The present invention also provides a diversity receiving apparatus for use in a radio communication system that uses an OFDM technique. The diversity receiving apparatus includes a plurality of diversity branches. Each of the diversity branches has a receiver for receiving an OFDM signal via an antenna and outputting the OFDM received signal, a first transformer for transforming the OFDM received signal into a frequency spectrum and outputting the OFDM received signal frequency spectrum, and a channel frequency response calculating unit for calculating a channel frequency response in accordance with the OFDM received signal frequency spectrum and a reference frequency spectrum. A selector unit selects the diversity branch that has generated the channel frequency response having a maximum amplitude or a maximum power.

More specifically, a first aspect of the present invention provides a diversity receiving apparatus for use in a radio communication system that uses an OFDM technique. The diversity receiving apparatus includes a plurality of receivers, each of the receivers for receiving an OFDM signal via an antenna and outputting the OFDM received signal. Each of a plurality of first transformers transforms the OFDM received signal into a frequency spectrum. At least one reference frequency spectrum generator generates a reference frequency spectrum relative to the OFDM received signal. Each of a plurality of channel frequency response calculating units calculates a channel frequency response in accordance with the frequency spectrum output from each of the first transformers and the reference frequency spectrum. A distortion compensator compensates for a distortion of the frequency spectrum output from each of the first transformers by using the corresponding channel frequency response. The frequency spectra output from the first transformers are input into a selector unit as first input signals, while the distortion-compensated frequency spectra output from the distortion compensator are input into the selector unit as second input signals. The selector unit then selects and outputs the second input signal corresponding to the first input signal having a maximum amplitude or a maximum power. A demodulator demodulates the output signal of the selector unit into a digital signal sequence.

A second aspect of the present invention provides a diversity receiving apparatus for use in a radio communication system that uses an OFDM technique. The diversity receiving apparatus includes a plurality of receivers, each of the receivers for receiving an OFDM signal via an antenna and outputting the OFDM received signal. Each of a plurality of first transformers transforms the OFDM received signal into a frequency spectrum. At least one reference frequency spectrum generator generates a reference frequency spectrum relative to the OFDM received signal. Each of a plurality of channel frequency response calculating units calculates a channel frequency response in accordance with the frequency spectrum output from each of the first transformers and the reference frequency spectrum. A distortion compensator compensates for a distortion of the frequency spectrum output from each of the first transformers by using the corresponding channel frequency response. The channel frequency responses calculated by the channel frequency response calculating units are input into a selector unit as first input signals, while the distortion-compensated frequency spectra output from the distortion compensator are input into the selector unit as second input signals. The selector unit then selects and outputs the second input signal corresponding to the first input signal having a maximum amplitude or a maximum power. A demodulator demodulates the output signal of the selector unit into a digital signal sequence.

A third aspect of the present invention provides a diversity receiving apparatus for use in a radio communication system that uses an OFDM technique. The diversity receiving apparatus includes a plurality of receivers, each of the receivers for receiving an OFDM signal via an antenna and outputting the OFDM received signal. Each of a plurality of first transformers transforms the OFDM received signal into a frequency spectrum. At least one reference frequency spectrum generator generates a reference frequency spectrum relative to the OFDM received signal. Each of a plurality of channel frequency response calculating units calculates a channel frequency response in accordance with the frequency spectrum output from each of the first transformers and the reference frequency spectrum. A distortion compensator compensates for a distortion of the frequency spectrum output from each of the first transformers by using the corresponding channel frequency response. A selector unit selects and outputs, among the distortion-compensated frequency spectra output from the distortion compensator, the distortion-compensated frequency spectrum having a maximum amplitude or a maximum power. A demodulator demodulates the output signal of the selector unit into a digital signal sequence.

Upon generation of frequency selective fading, the receiving characteristics are completely different according to the line spectrum which forms a frequency spectrum. Even under this environment, according to the first, second, and third aspects of the present invention, diversity reception that obtains optimal receiving characteristics for each line spectrum can be achieved. It is thus possible to effectively suppress the degradation of the receiving characteristics caused under a multiple reflection propagation environment or a mobile receiving environment.

A fourth aspect of the present invention provides a diversity receiving apparatus for use in a radio communication system that uses an OFDM technique. The diversity receiving apparatus includes a plurality of receivers, each of the receivers for receiving an OFDM signal via an antenna and outputting the OFDM received signal. Each of a plurality of first transformers transforms the OFDM received signal into a frequency spectrum. At least one reference frequency spectrum generator generates a reference frequency spectrum relative to the OFDM received signal. Each of a plurality of channel frequency response calculating units calculates a channel frequency response in accordance with the frequency spectrum output from each of the first transformers and the reference frequency spectrum. The frequency spectra output from the first transformers are input into a selector unit as first input signals, while the channel frequency responses calculated by the channel frequency response calculating units are input into the selector unit as second input signals. The selector unit then selects the first input signal having a maximum amplitude or a maximum power and the second input signal corresponding to the selected first input signal. The selector unit further outputs the selected first input signal and the selected second input signal as a first output signal and a second output signal, respectively. A distortion compensator compensates for a distortion of the first output signal of the selector unit by using the second output signal of the selector unit. A demodulator demodulates the output signal of the distortion compensator into a digital signal sequence.

A fifth aspect of the present invention provides a diversity receiving apparatus for use in a radio communication system that uses an OFDM technique. The diversity receiving apparatus includes a plurality of receivers, each of the receivers for receiving an OFDM signal via an antenna and outputting the OFDM received signal. Each of a plurality of first transformers transforms the OFDM received signal into a frequency spectrum. At least one reference frequency spectrum generator generates a reference frequency spectrum relative to the OFDM received signal. Each of a plurality of channel frequency response calculating units calculates a channel frequency response in accordance with the frequency spectrum output from each of the first transformers and the reference frequency spectrum. The channel frequency responses calculated by the channel frequency response calculating units are input into a selector unit as first input signals, while the frequency spectra output from the first transformers are input into the selector unit as second input signals. The selector unit then selects the first input signal having a maximum amplitude or a maximum power and the second input signal corresponding to the selected first input signal. The selector unit further outputs the selected first input signal and the selected second input signal as a first output signal and a second output signal, respectively. A distortion compensator compensates for a distortion of the second output signal of the selector unit by using the first output signal of the selector unit. A demodulator demodulates the output signal of the distortion compensator into a digital signal sequence.

Upon generation of frequency selective fading, the receiving characteristics are completely different according to the line spectrum which forms a frequency spectrum. Even under this environment, according to the first, second, and third aspects of the present invention, diversity reception that obtains optimal receiving characteristics for each line spectrum can be achieved. It is thus possible to effectively inhibit the degradation of the receiving characteristics caused under a multiple reflection propagation environment or a mobile receiving environment. Additionally, only a single distortion compensator is required.

According to the first, second, or third aspect of the present invention, a filtering unit for filtering the channel frequency response calculated by each of the channel frequency response calculating units may be disposed between each of the channel frequency response calculating units and the distortion compensator. Similarly, according to the fourth or fifth aspect of the present invention, a filtering unit for filtering the channel frequency response calculated by each of the channel frequency response calculating units may be disposed between each of the channel frequency response calculating units and the selector unit. By the provision of the filtering unit, noise components contained in the channel frequency responses can be eliminated, thereby further enhancing the receiving characteristics.

The above filtering unit may include a filtering-bandwidth-variable filter that receives the channel frequency response calculated by each of the channel frequency response calculating units, a second transformer for transforming the channel frequency response into a channel impulse response, a propagation delay period measuring portion for measuring, based on the channel impulse response, the propagation delay period caused under a multiple reflection propagation environment, and a filtering bandwidth setting portion for setting the filtering bandwidth of the filter based on the measurements by the propagation delay period measuring portion. With this arrangement, the propagation delay period of a multiple reflection propagation environment can be measured, thereby setting the bandwidth of the filter in response to the propagation delay period. As a result, noise components included in the channel frequency response of the propagation delay period can be efficiently eliminated.

The present invention may further include a re-modulator for re-modulating the digital signal sequence demodulated by the demodulator and for generating a re-modulated frequency spectrum, and a frequency spectrum selector for selectively outputting the re-modulated frequency spectrum or the reference frequency spectrum to the channel frequency response calculating units.

In a communication system or a broadcasting system in which digital signal sequences are transmitted according to an OFDM transmission method using a slot, the frequency spectrum selector may select the reference frequency spectrum when receiving an OFDM signal of a known data sequence contained in the head of the slot. When receiving the OFDM signals of the other data sequences, the frequency spectrum selector may select the re-modulated frequency spectrum. Upon calculating the channel frequency response by using the re-modulated frequency spectrum, the distortions of the frequency spectrum can be compensated by using the most updated channel frequency response. It is thus possible to improve the receiving characteristics even under a dynamic propagation environment.

According to the present invention, the selector unit may include a plurality of synthesizers for synthesizing the amplitudes or the power of line spectra forming the first input signal, and a comparator for comparing outputs of the synthesizers, thereby performing a selecting operation based on a comparison result of the comparator. With this arrangement, the diversity branch that exhibits excellent receiving characteristics can be easily selected, thereby effectively enhancing the receiving characteristics.

Alternatively, the selector unit may include a comparator for comparing, among line spectra forming the first input signal, the amplitude or the power of the line spectra of the same frequency, thereby performing a selecting operation based on a comparison result of the comparator. This makes it possible to easily select the diversity branch that exhibits excellent receiving characteristics for each line spectrum, thereby improving the receiving characteristics even more effectively.

A sixth aspect of the present invention provides a method for receiving a diversity signal for use in a radio communication system that uses an OFDM technique. The method includes the steps of: providing a plurality of diversity branches, each of the diversity branches including a receiver for receiving an OFDM signal via an antenna and outputting the OFDM received signal, a first transformer for transforming the OFDM received signal into a frequency spectrum and outputting the OFDM received signal frequency spectrum, and a channel frequency response calculating unit for calculating a channel frequency response in accordance with the OFDM received signal frequency spectrum and a reference frequency spectrum; and selecting the diversity branch that has generated the OFDM received signal frequency spectrum having a maximum amplitude or a maximum power.

A seventh aspect of the present invention provides a method for receiving a diversity signal for use in a radio communication system that uses an OFDM technique. The method includes the steps of: providing a plurality of diversity branches, each of the diversity branches including a receiver for receiving an OFDM signal via an antenna and outputting the OFDM received signal, a first transformer for transforming the OFDM received signal into a frequency spectrum and outputting the OFDM received signal frequency spectrum, and a channel frequency response calculating unit for calculating a channel frequency response in accordance with the OFDM received signal frequency spectrum and a reference frequency spectrum; and selecting the diversity branch that has generated the channel frequency response having a maximum amplitude or a maximum power.

An eighth aspect of the present invention provides a method for receiving a diversity signal for use in a radio communication system that uses an OFDM technique. The method includes the steps of receiving an OFDM signal via an antenna and outputting the OFDM received signal; transforming the OFDM received signal into a frequency spectrum; generating a reference frequency spectrum relative to the OFDM received signal; calculating a channel frequency response in accordance with the frequency spectrum and the reference frequency spectrum; compensating for a distortion of the frequency spectrum by using the corresponding channel frequency response; selecting and outputting, if the frequency spectra are determined as first input signals and the distortion-compensated frequency spectra are determined as second input signals, the second input signal corresponding to the first input signal having a maximum amplitude or a maximum power; and demodulating the output signal of the selecting step into a digital signal sequence.

A ninth aspect of the present invention, there is provided a method for receiving a diversity signal for use in a radio communication system that uses an OFDM technique. The method includes the steps of receiving an OFDM signal via an antenna and outputting the OFDM received signal; transforming the OFDM received signal into a frequency spectrum; generating a reference frequency spectrum relative to the OFDM received signal; calculating a channel frequency response in accordance with the frequency spectrum and the reference frequency spectrum; compensating for a distortion of the frequency spectrum by using the corresponding channel frequency response; selecting and outputting, if the channel frequency responses are determined as first input signals and the distortion-compensated frequency spectra are determined as second input signals, the second input signal corresponding to the first input signal having a maximum amplitude or a maximum power; and demodulating the output signal of the selecting step into a digital signal sequence.

A tenth aspect of the present invention provides a method for receiving a diversity signal for use in a radio communication system that uses an OFDM technique. The method includes the steps of receiving an OFDM signal via an antenna and outputting the OFDM received signal; transforming the OFDM received signal into a frequency spectrum; generating a reference frequency spectrum relative to the OFDM received signal; calculating a channel frequency response in accordance with the frequency spectrum and the reference frequency spectrum; compensating for a distortion of the frequency spectrum by using the corresponding channel frequency response; selecting and outputting, among the distortion-compensated frequency spectra, the distortion-compensated frequency spectrum having a maximum amplitude or a maximum power; and demodulating the output signal of the selecting step into a digital signal sequence.

An eleventh aspect of the present invention provides a method for receiving a diversity signal for use in a radio communication system that uses an OFDM technique. The method includes the steps of receiving an OFDM signal via an antenna and outputting the OFDM received signal; transforming the OFDM received signal into a frequency spectrum; generating a reference frequency spectrum relative to the OFDM received signal; calculating a channel frequency response in accordance with the frequency spectrum and the reference frequency spectrum; selecting, if the frequency spectra are determined as first input signals and the channel frequency responses are determined as second input signals, the first input signal having a maximum amplitude or a maximum power and the second input signal corresponding to the selected first input signal, and outputting the selected first input signal and the selected second input signal as a first output signal and a second output signal, respectively; compensating for a distortion of the first output signal by using the second output signal; and demodulating the output signal of the compensating step into a digital signal sequence.

A twelfth aspect of the present invention provides a method for receiving a diversity signal for use in a radio communication system that uses an OFDM technique. The method includes the steps of receiving an OFDM signal via an antenna and outputting the OFDM received signal; transforming the OFDM received signal into a frequency spectrum; generating a reference frequency spectrum relative to the OFDM received signal; calculating a channel frequency response in accordance with the frequency spectrum and the reference frequency spectrum; selecting, if the channel frequency responses are determined as first input signals and the frequency spectra are determined as second input signals, the first input signal having a maximum amplitude or a maximum power and the second input signal corresponding to the selected first input signal, and outputting the selected first input signal and the selected second input signal as a first output signal and a second output signal, respectively; compensating for a distortion of the second output signal by using the first output signal; and demodulating the output signal of the compensating step into a digital signal sequence.

DESCRIPTION OF THE PREFERRED EMBODIMENTS

The preferred embodiments of the present invention are described in detail below with reference to the drawings.

First Embodiment

Figure 1:
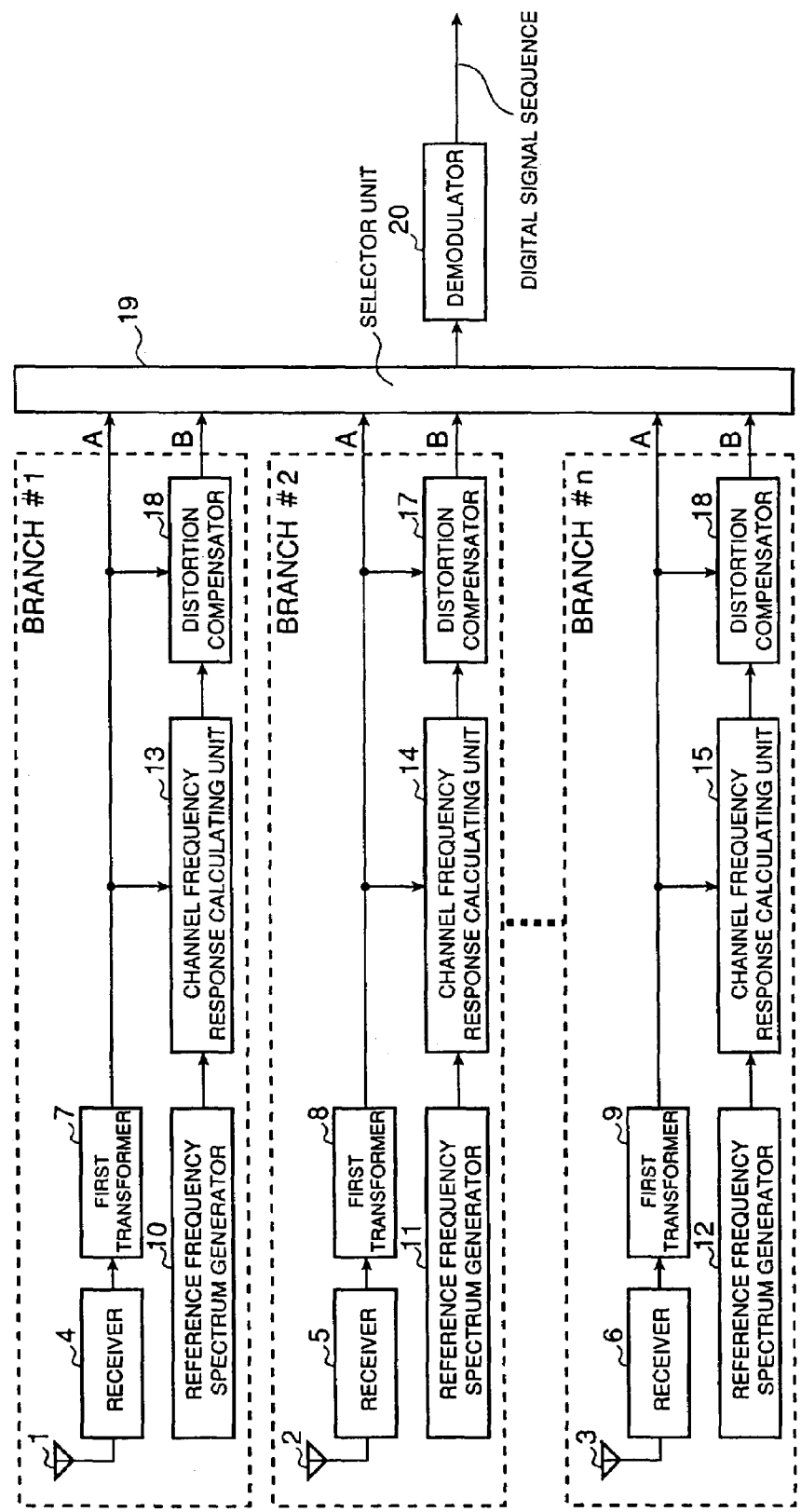
FIG. 1 is a block diagram illustrating an OFDM diversity receiving apparatus according to a first embodiment of the present invention.

Referring to the block diagram illustrating an OFDM diversity receiving apparatus according to a first embodiment of the present invention in FIG. 1, a number n of diversity branches ("branches") #1 through #n are disposed. In the respective branches #1 through #n, OFDM signals are received by receiving antennas 1 through 3 and are input into receivers 4 through 6, respectively. Each of the receivers 4 through 6 has basic functions, such as amplification, frequency mixing, and filtering, that are required for frequency-converting an RF-band OFDM signal into a baseband signal, and also has functions, such as synchronization, frequency correction, and guard interval removal, that are inherent to the OFDM transmission method. The baseband signal from which the guard interval has been removed is then output as an OFDM received signal.

The OFDM received signals output from the receivers 4 through 6 are input into first transformers 7 through 9, respectively, and are transformed into frequency spectra ("OFDM received signal frequency spectra") by transformation processing represented by fast Fourier transform (FFT).

Reference frequency spectrum generators 10 through 12 respectively generate reference frequency spectra relative to the OFDM received signal frequency spectra output from the first transformers 7 through 9. Channel frequency response calculating units 13 through 15 respectively calculate channel frequency responses inherent in the branches #1 through #n by using the OFDM received signal frequency spectra and the reference frequency spectra.

The OFDM received signal frequency spectra generated in the first transformers 7 through 9 are respectively input into distortion compensators 16 through 18, and the distortions included in the OFDM received signal frequency spectra caused by the multiple reflection propagation environment are compensated for by using the channel frequency responses of the branches #1 through #n calculated in the channel frequency response calculating units 13 through 15, respectively. The OFDM received signal frequency spectra generated in the first transformers 7 through 9 are input into a selector unit 19 as first input signals A, while the distortion-compensated frequency spectra generated in the distortion compensators 16 through 18 are input into the selector unit 19 as second input signals B.

The selector unit 19 then compares the OFDM received signal frequency spectra generated in the first transformers 7 through 9 of the branches #1 through #n, i.e., compares the first input signals A. Upon comparison, the selector unit 19 first selects the branch that has generated the frequency spectrum having the maximum amplitude or the maximum power, and then selects the distortion-compensated OFDM received signal frequency spectrum output from the selected branch and input into the selector unit 19. The selected distortion-compensated OFDM received signal frequency spectrum is input into a demodulator 20 and is demodulated into a digital signal sequence. The selector unit 19 is described in detail below.

In this embodiment, the selector unit 19 may select the branch by comparing the OFDM received signal frequency spectra included in each symbol of the OFDM received signal output from each of the first transformers 7 through 9. If, however, the propagation environment does not change sharply with a lapse of time, the branch may be selected by using the OFDM received signal frequency spectra that were calculated within a predetermined time before the selection. In this case, it is almost possible to fix a branch to be selected in advance, or to suitably set a branch to be selected in a few units of symbols.

According to the first embodiment, the branch that has generated the OFDM received signal frequency spectrum having the maximum power or the maximum amplitude is selected from a plurality of branches #1 through #n. Then, the distortion-compensated OFDM received signal frequency spectrum obtained in the selected branch is demodulated into a digital signal sequence. As a consequence, receiving characteristics can be enhanced.

(Selector Unit 19)

Figure 2:
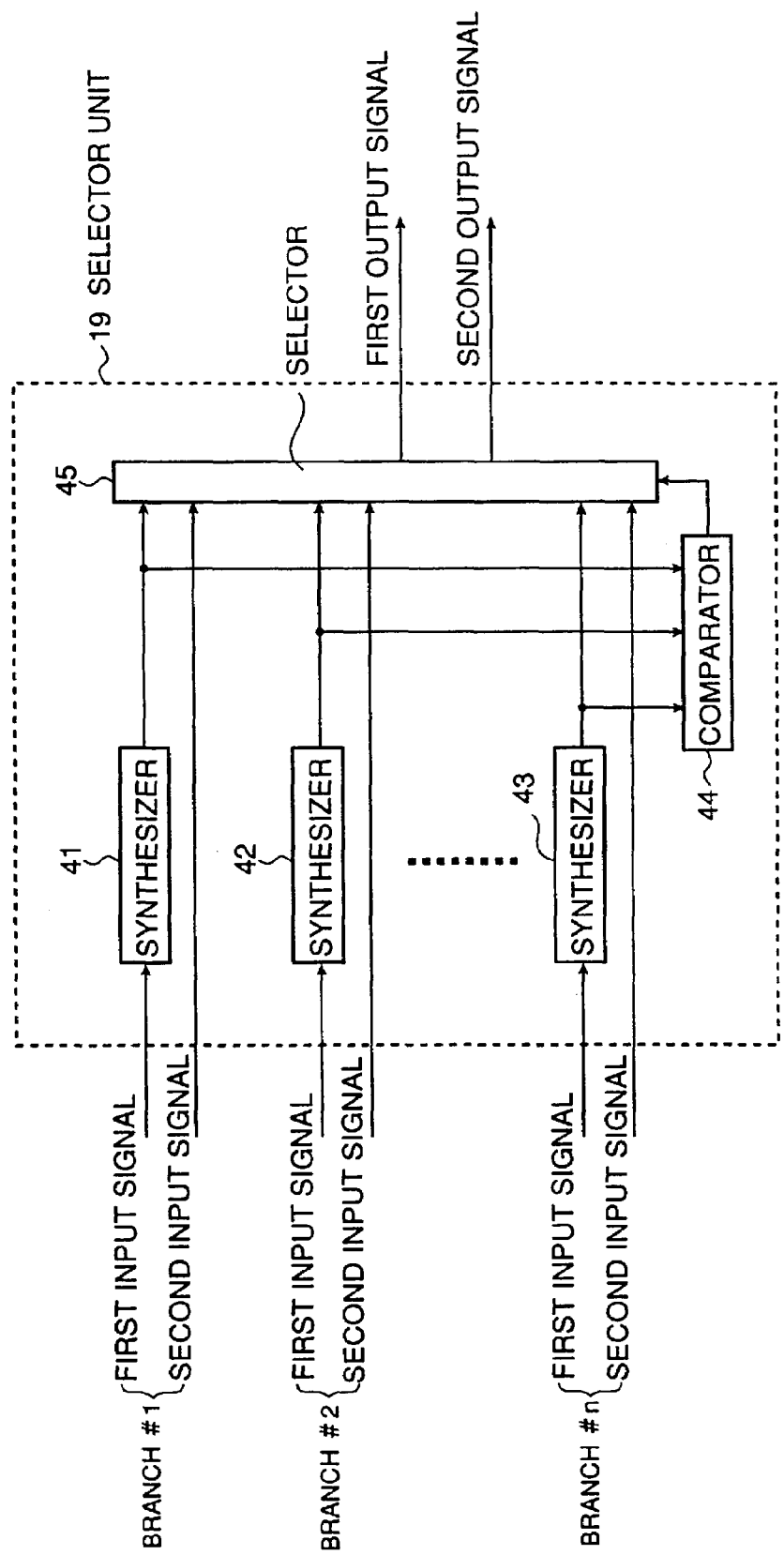
FIG. 2 is a block diagram illustrating an example of the configuration of a selector unit for use in an OFDM diversity receiving apparatus according to the present invention.

An example of the configuration of the selector unit 19 is discussed below with reference to FIG. 2.

The first input signals A output from the branches #1 through #n are respectively input into synthesizers 41 through 43 of the selector unit 19. In the first embodiment, the first input signals A are equivalent to the OFDM received signal frequency spectra output from the first transformers 7 through 9. In some of the subsequent embodiments described below, however, the channel frequency responses output from the channel frequency response calculating units 13 through 15 are used as the first input signals A. Generally, the first transformers 7 through 9 each perform FFT to transform the OFDM received signal into the OFDM received signal frequency spectrum. Thus, the frequency spectrum is formed of a plurality of discrete line spectra, and the channel frequency response calculated by using the OFDM received signal frequency spectrum is also formed of a plurality of discrete line spectra.

Each of the synthesizers 41 through 43 synthesizes the amplitude or the power of a plurality of line spectra of the first input signal A and outputs the synthesized amplitude or power. In this case, each of the synthesizers 41 through 43 generally synthesizes the amplitude or the power of line spectra included in one symbol of an OFDM received signal. However, the synthesizers 41 through 43 may synthesize a few line spectra or line spectra included in a few symbols of an OFDM received signal. The outputs of the synthesizers 41 through 43 are input into a comparator 44 and a selector 45.

The comparator 44 compares the outputs of the synthesizers 41 through 43 corresponding to the branches #1 through #n and identifies the branch that has generated the maximum output. The comparator 44 then informs the selector 45 of the identified branch number. The selector 45 transmits the output signal, which serves as a first output signal, of the synthesizer corresponding to the branch number informed by the comparator 44.

As discussed above, the selector unit 19 identifies the branch that has generated the output having the maximum amplitude or the maximum power synthesized from a plurality of line spectra of the first input signal A. The selector unit 19 then selects the first input signal A output from the identified branch, and outputs it to the demodulator 20. It is thus possible to identify the optimal branch from the average receiving characteristics of a plurality of line spectra in each of the branches #1 through #n, and to select the first input signal A from the identified branch. As a result, the receiving characteristics can be enhanced more effectively.

Another example of the configuration of the selector unit 19 is described below with reference to FIG. 3.

Figure 3:
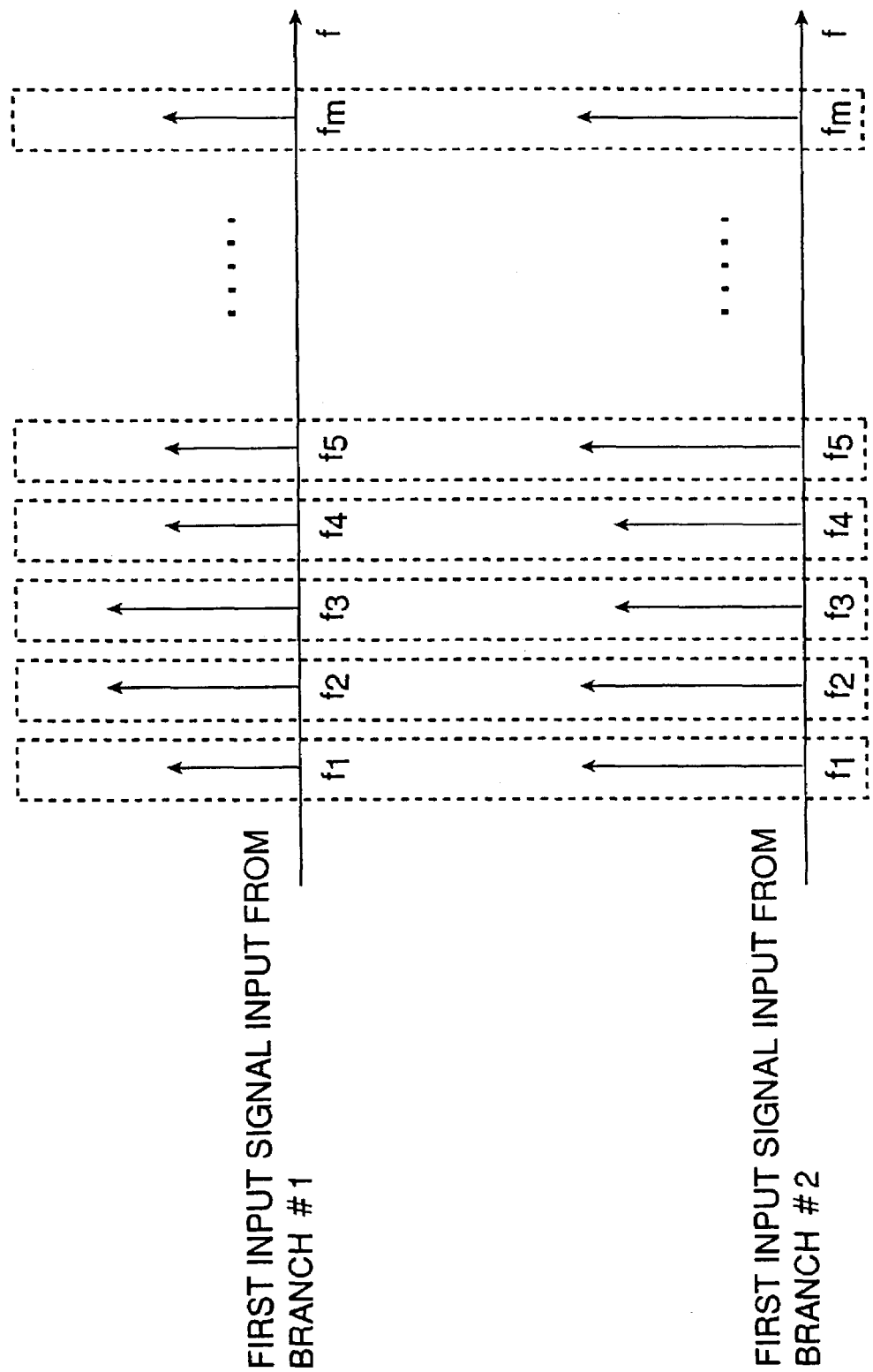
FIG. 3 is a block diagram illustrating another example of the configuration of a selector unit for use in an OFDM diversity receiving apparatus according to the present invention.

FIG. 3 illustrates the operation of the selector unit 19 when two branches are used. The first input signal A is formed of m number of discrete line spectra of frequencies $f_1$ through $f_m$. The selector unit 19 compares the amplitude or the power of the line spectra of the same frequency of the first input signals A. Then, the selector unit 19 selects the branch that has output the line spectrum having the maximum amplitude or the maximum power of each of the frequencies $f_1$ through $f_m$.

According to the above configuration of the selector unit 19, the branch that has output the line spectrum having the maximum amplitude or the maximum power of each frequency can be selected, thereby significantly improving the receiving characteristics.

Second Embodiment

Figure 4:
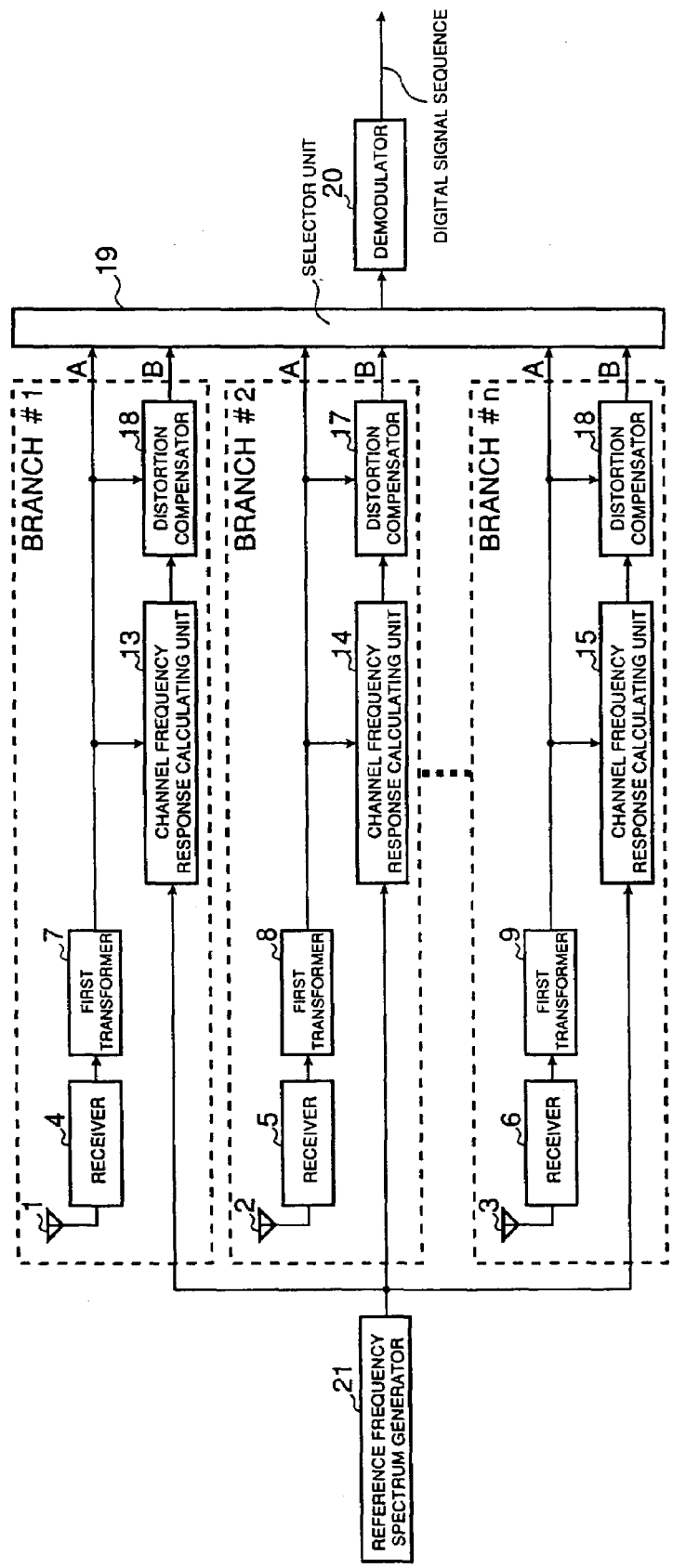
FIG. 4 is a block diagram illustrating an OFDM diversity receiving apparatus according to a second embodiment of the present invention.

FIG. 4 is a block diagram illustrating an OFDM diversity receiving apparatus according to a second embodiment of the present invention.

The second embodiment is constructed substantially similarly to the first embodiment, except that a single reference-frequency-spectrum generator 21 is shared among the respective branches #1 through #n, because all the reference frequency spectra generated in the reference frequency spectrum generators 10 through 12 are the same. Accordingly, an improvement in the receiving characteristics similar to that offered by the first embodiment can be achieved.

In the second embodiment, as well as in the first embodiment, the selector unit 19 may select the branch by comparing the OFDM received signal frequency spectra included in each symbol of an OFDM received signal output from each of the first transformers 7 through 9. Alternatively, if the propagation environment does not change drastically during a period of time, the branch may be selected by using the OFDM received signal frequency spectra that were calculated within a predetermined time before the selection.

Third Embodiment

Figure 5:
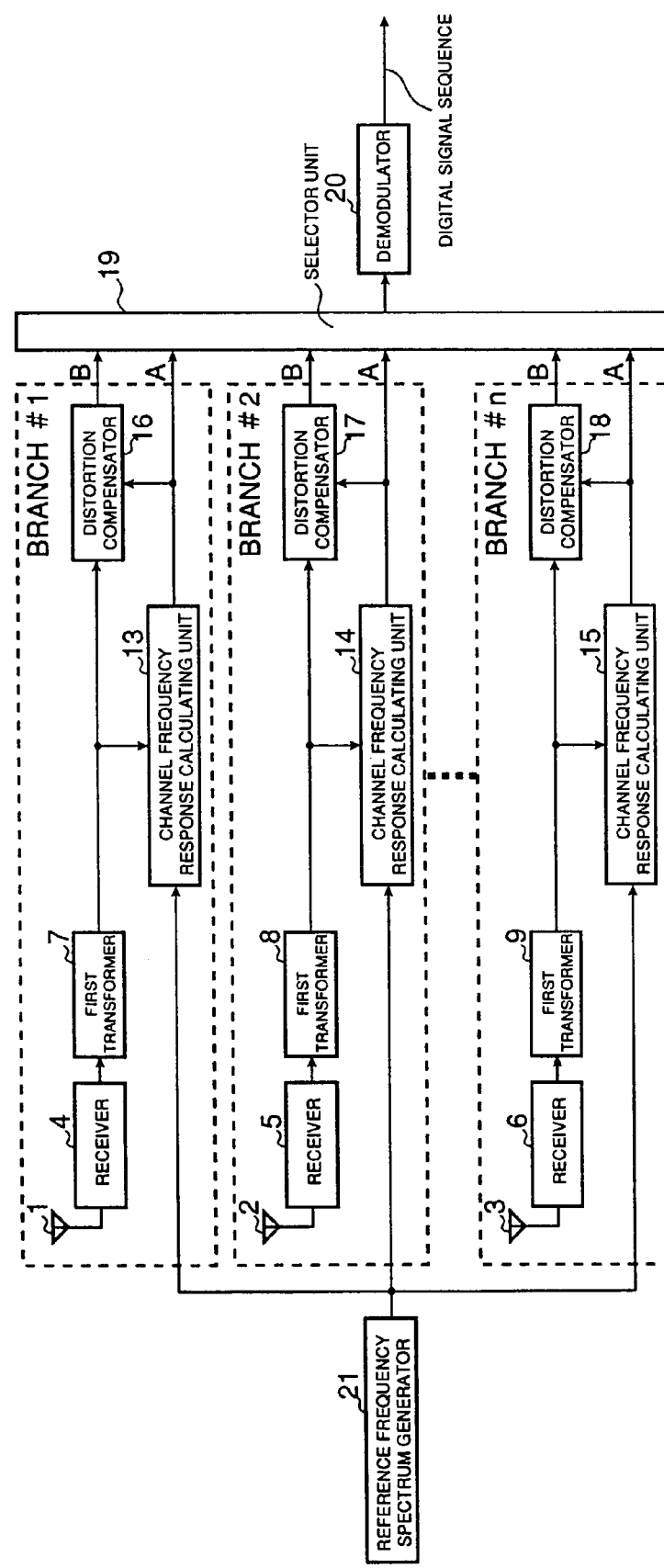
FIG. 5 is a block diagram illustrating an OFDM diversity receiving apparatus according to a third embodiment of the present invention.

FIG. 5 is a block diagram illustrating an OFDM diversity receiving apparatus according to a third embodiment of the present invention. In the third embodiment, as well as in the first embodiment, the branches #1 through #n generate channel frequency responses and distortion-compensated OFDM received signal frequency spectra. The channel frequency responses produced in the channel frequency response calculating units 13 through 15 are directly input into the selector unit 26 as first input signals A, while the distortion-compensated OFDM received signal frequency spectra generated in the distortion compensators 16 through 18 are input into the selector unit 26 as second input signals B.

The selector unit 26 compares the channel frequency responses generated in the branches #1 through #n, i.e., compares the first input signals A, and selects the branch that has generated the channel frequency response having the maximum amplitude or the maximum power. The selector unit 26 then selects the distortion-compensated OFDM received signal frequency spectrum, i.e., the second input signal B, from the selected branch, and the selected frequency spectrum is further demodulated into a digital signal sequence in the demodulator 20.

According to the third embodiment, it is possible to select the branch that has generated the channel frequency response having the maximum amplitude or the maximum power from a plurality of branches #1 through #n. Then, a digital signal sequence is demodulated from the distortion-compensated frequency spectrum obtained in the selected branch. As a result, receiving characteristics are considerably improved.

In this embodiment, as well as in the second embodiment illustrated in FIG. 4, a single reference-frequency-spectrum generator 21 is shared among the branches #1 through #n. However, individual reference-frequency-spectrum generators may be provided for the respective branches #1 through #n, as in the first embodiment shown in FIG. 1.

In the third embodiment, as well as in the first embodiment, if the propagation environment does not change drastically during a period of time, the branch may be selected by using the channel frequency responses calculated within a predetermined time before the selection. Accordingly, instead of selecting the branch by using the channel frequency responses in each symbol of the OFDM received signal, it is almost possible to fix a branch to be selected in advance, or to suitably set a branch to be selected in a few units of symbols.

Fourth Embodiment

Figure 6:
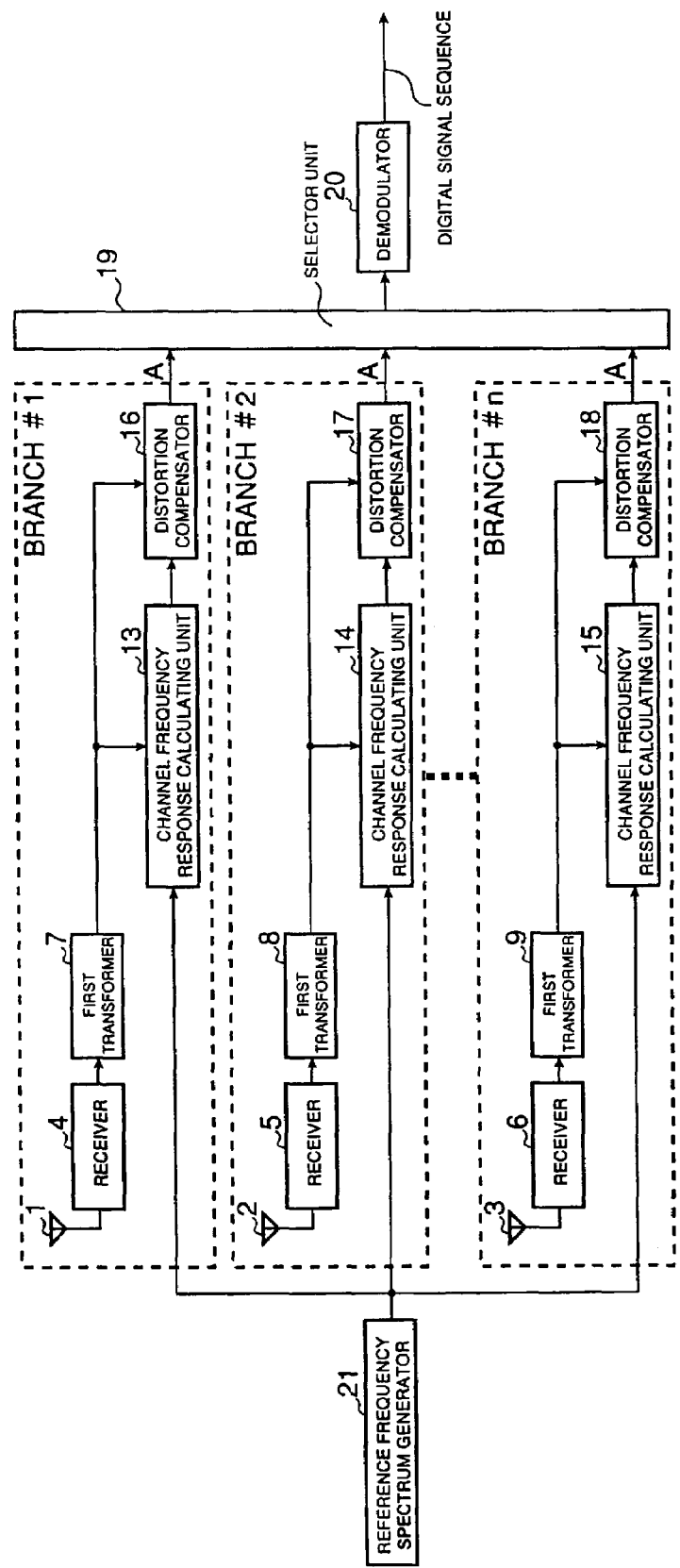
FIG. 6 is a block diagram illustrating an OFDM diversity receiving apparatus according to a fourth embodiment of the present invention.

FIG. 6 is a block diagram illustrating an OFDM diversity receiving apparatus according to a fourth embodiment of the present invention. In this embodiment, instead of the OFDM received signal frequency spectra output from the first transformers 7 through 9 in the second embodiment, distortion-compensated OFDM received signal frequency spectra output from the distortion compensators 16 through 18 are input into the selector unit 27 as first input signals A. Accordingly, only the first input signals A are input into the selector unit 27 from the branches #1 through #n.

More specifically, in the branches #1 through #n, the OFDM signals received by the receiving antennas 1 through 3 are respectively converted into baseband signals from which guard intervals are removed in the receivers 4 through 6. The baseband signals are then input into the first transformers 7 through 9 and are transformed into OFDM received signal frequency spectra by performing transformation processing, such as FFT.

The OFDM received signal frequency spectra output from the first transformers 7 through 9 are input into the channel frequency response calculating units 13 through 15 and further into the distortion compensators 16 through 18. The channel frequency response calculating units 13 through 15 calculate channel frequency responses by using the OFDM received signal frequency spectra and the reference frequency spectra generated in the reference frequency spectrum generator 21. Subsequently, the distortion compensators 16 through 18 compensate for the distortions of the OFDM received signal frequency spectra by using the channel frequency responses. Generally, for an amplitude modulation signal, such as a QAM signal, the distortion compensators 16 through 18 divide the OFDM received signal frequency spectra output from the first transformers 7 through 9 by the channel frequency responses, respectively, thereby compensating for frequency selective fading caused under a multiple response propagation environment. On the other hand, for a phase modulation signal, such as a quadrature phase shift keying (QPSK) signal, phase distortion is compensated for by using a multiplier rather than a divider, which inevitably increases the scale of the apparatus. More specifically, the distortion compensators 16 through 18 respectively compensate for phase distortions by multiplying the OFDM received signal frequency spectra output from the first transformers 7 through 9 with conjugate complex signals of the channel frequency responses. In this case, the amplitudes of the distortion-compensated OFDM received signal frequency spectra output from the distortion compensators 16 through 18 are proportional to the amplitude components of the OFDM received signal frequency spectra output from the first transformers 7 through 9. Thus, the selector unit 27 may select the branch by comparing the amplitudes or the power of the distortion-compensated OFDM received signal frequency spectra rather than comparing the OFDM received signal frequency spectra output from the first transformers 7 through 9.

Accordingly, in this embodiment, the selector unit 27 compares the distortion-compensated OFDM received signal frequency spectra input as the first input signals A and selects the branch that has generated the distortion-compensated OFDM received signal frequency spectrum having the maximum amplitude or the maximum power. Thus, the distortion-compensated OFDM received signal frequency spectrum input as the first input signal A from the selected branch, i.e., the distortion-compensated OFDM received signal frequency spectrum having the maximum amplitude or the maximum power, is output from the selector unit 27. The frequency spectrum is then demodulated into a digital signal sequence by the demodulator 20.

In this embodiment, the selector unit 27 compares the distortion-compensated OFDM received signal frequency spectra in each symbol of the OFDM received signal input from each branch. If, however, the propagation environment does not change drastically during a period of time, the branch may be selected by using the distortion-compensated OFDM received signal frequency spectra that were calculated within a predetermined time before the selection. Additionally, individual reference-frequency-spectrum generators may be provided for the respective branches #1 through #n, as in the first embodiment illustrated in FIG. 1.

Fifth Embodiment

Figure 7:
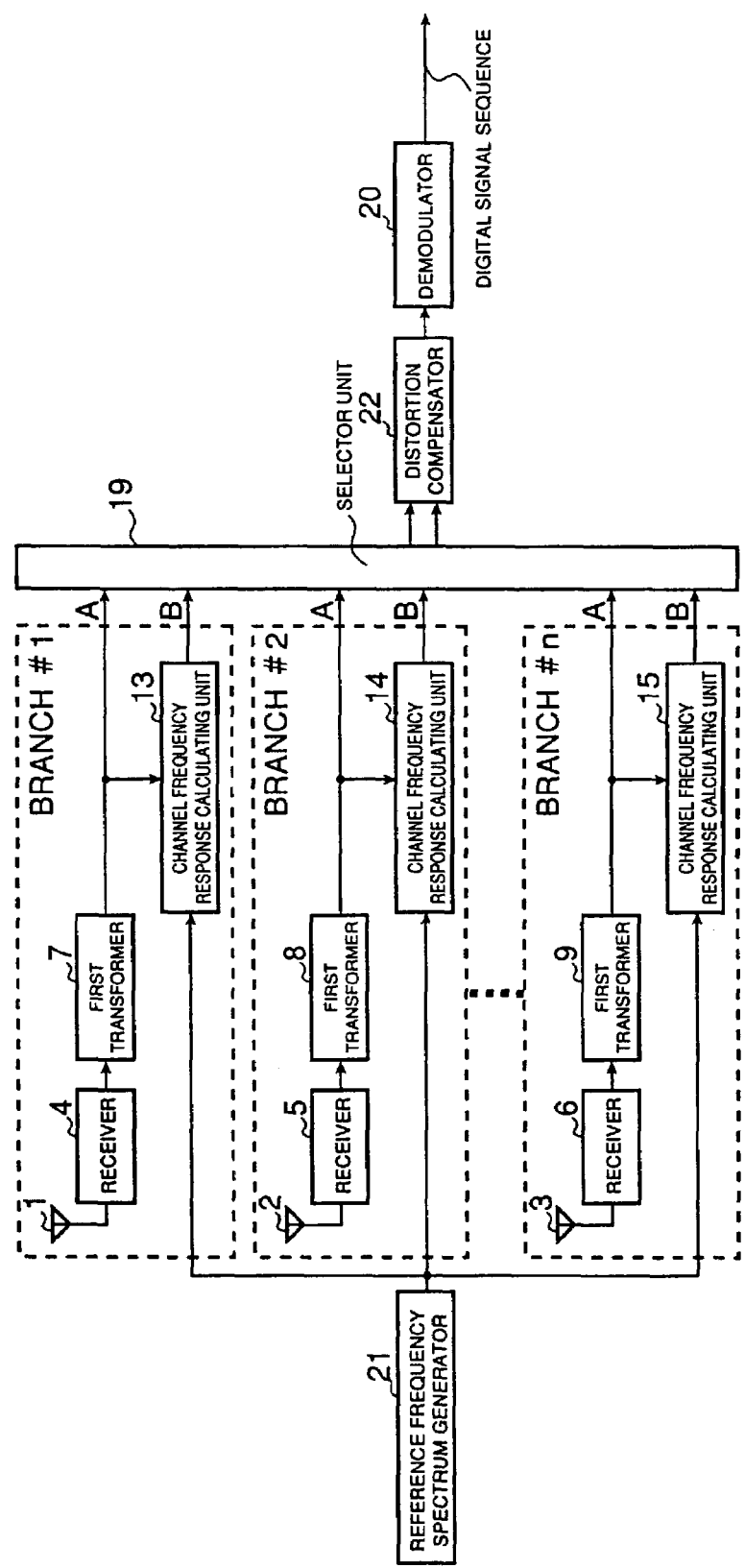
FIG. 7 is a block diagram illustrating an OFDM diversity receiving apparatus according to a fifth embodiment of the present invention.

FIG. 7 is a block diagram illustrating an OFDM diversity receiving apparatus according to a fifth embodiment of the present invention. In this embodiment, after the selector unit 19 has selected the branch, the distortion of the OFDM received signal frequency spectrum output from the selected branch is compensated for by using the channel frequency response of the selected branch.

More specifically, in the branches #1 through #n, the OFDM signals received by the receiving antennas 1 through 3 are respectively converted into baseband signals in the receivers 4 through 6. The baseband signals are further transformed into OFDM received signal frequency spectra by the first transformers 7 through 9. The channel frequency response calculating units 13 through 15 calculate channel frequency responses from the OFDM received signal frequency spectra and the reference frequency spectrum generated by the reference frequency spectrum generator 21. The OFDM received signal frequency spectra are input into the selector unit 19 as first input signals A, while the channel frequency responses are input into the selector unit 19 as second input signals B.

The selector unit 19 then compares the OFDM received signal frequency spectra, which serve as the first input signals A, generated in the branches #1 through #n and selects the branch that has generated the OFDM received signal frequency spectrum having the maximum amplitude or the maximum power. Then, the OFDM received signal frequency spectrum and the channel frequency response which are output from the selected branch are input into a distortion compensator 22. The selector unit 19 may be configured similarly to that shown in FIG. 2 or 3.

The distortion compensator 22 compensates for the distortion of the OFDM received signal frequency spectrum output from the selector unit 19 by using the channel frequency response output from the selector unit 19. The distortion-compensated OFDM received signal frequency spectrum output from the distortion compensator 22 is demodulated into a digital signal sequence in the demodulator 20.

In this manner, according to this embodiment, the branch that has generated the OFDM received signal frequency spectrum having the maximum amplitude or the maximum power is selected from a plurality of branches #1 through #n. The distortion of the OFDM received signal frequency spectrum is then compensated for by using the channel frequency response obtained in the selected branch, and the distortion-compensated frequency spectrum is demodulated into a digital signal sequence. With this arrangement, receiving characteristics can be improved. Additionally, only a single distortion compensator is required in this embodiment, thereby miniaturizing the receiving apparatus compared to those of the foregoing embodiments.

In this embodiment, a single reference-frequency-spectrum generator 21 is shared among the branches #1 through #n. However, individual reference-frequency-spectrum generators may be provided for the respective branches #1 through #n, as in the first embodiment illustrated in FIG. 1.

In the fifth embodiment, as well as in the first through fourth embodiments, the selector unit 19 may select the branch by comparing the OFDM received signal frequency spectra or the channel frequency responses in each symbol of an OFDM received signal. Alternatively, the branch may be selected by using the OFDM received signal frequency spectra or the channel frequency responses that were calculated within a predetermined time before the selection.

Sixth Embodiment

Figure 8:
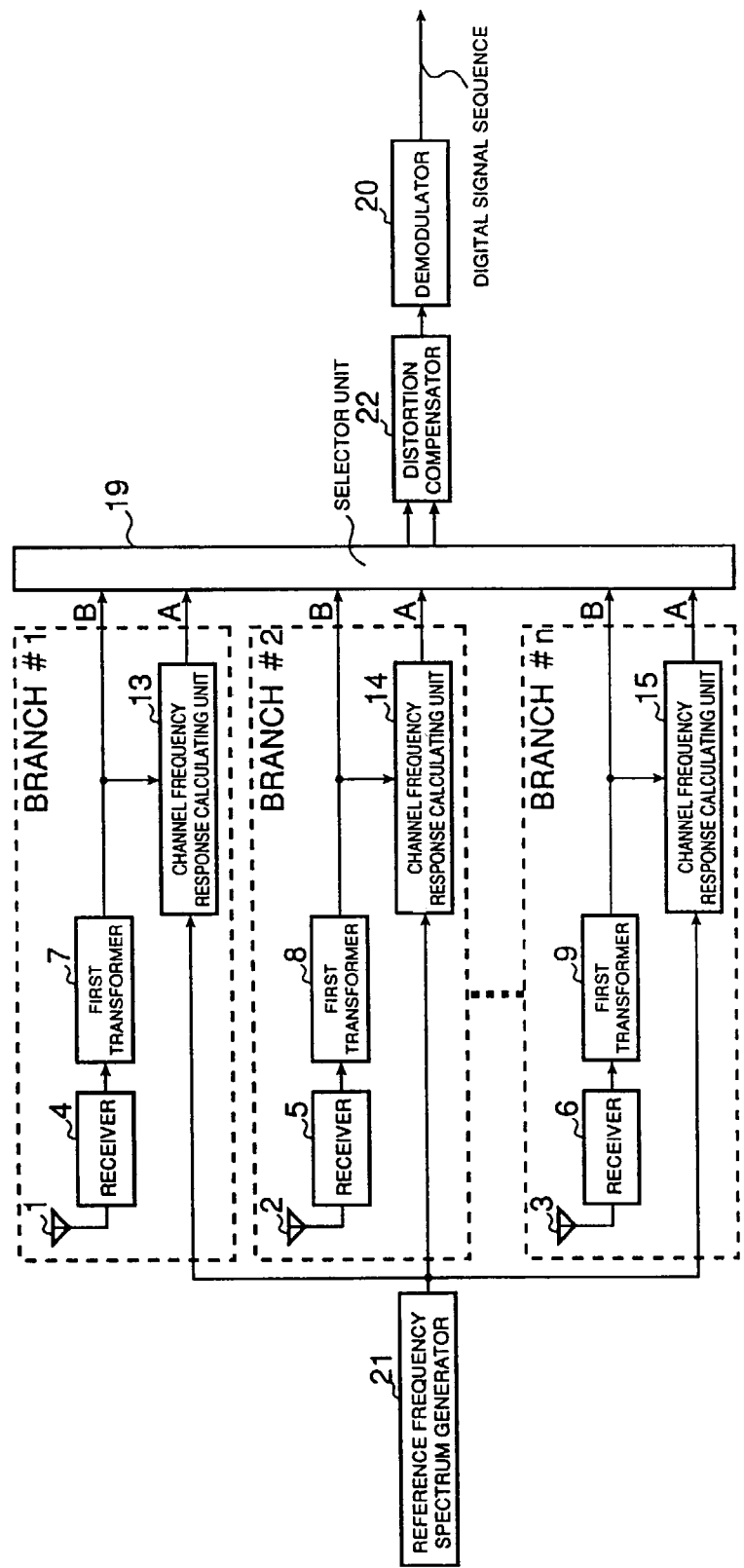
FIG. 8 is a block diagram illustrating an OFDM diversity receiving apparatus according to a sixth embodiment of the present invention.

FIG. 8 is a block diagram illustrating an OFDM diversity receiving apparatus according to a sixth embodiment of the present invention. In this embodiment, as well as in the fifth embodiment shown in FIG. 7, only a single distortion compensator is required due to the following configuration. After the selector unit 19 has selected the branch, the distortion of the OFDM received signal frequency spectrum output from the selected branch is compensated for by using the channel frequency response of the selected branch.

More specifically, as in the fifth embodiment, in the branches #1 through #n, the OFDM received signal frequency spectra are generated in the first transformers 7 through 9, and the channel frequency responses are generated in the channel frequency response calculating units 13 through 15. Unlike the fifth embodiment, however, the channel frequency responses are input into the selector unit 19 as first input signals A, while the OFDM received signal frequency spectra are input into the selector unit 19 as second input signals B.

The selector unit 19 compares the channel frequency responses generated in the branches #1 through #n as the first input signals A and selects the branch that has generated the channel frequency response having the maximum amplitude or the maximum power. The selector unit 19 may be configured substantially similarly to that shown in FIG. 2 or 3. The OFDM received signal frequency spectrum and the channel frequency response which are output from the selected branch are input into the distortion compensator 22.

The distortion compensator 22 compensates for the distortion of the OFDM received signal frequency spectrum output from the selector unit 19 by using the channel frequency response output from the selector unit 19. The distortion-compensated OFDM received signal frequency spectrum output from the distortion compensator 22 is then demodulated into a digital signal sequence in the demodulator 20.

According to this embodiment, the branch that has generated the channel frequency response having the maximum power or the maximum amplitude is selected from a plurality of branches #1 through #n. The distortion of the OFDM received signal frequency spectrum of the selected branch is then compensated for by using the channel frequency response obtained in the selected branch, and the distortion-compensated OFDM received signal frequency spectrum is demodulated into a digital signal sequence. As a result, the receiving characteristics can be enhanced. Additionally, the sixth embodiment, as well the fifth embodiment, requires only a single distortion compensator, thereby reducing the size of the receiving apparatus.

Seventh Embodiment

Figure 9:
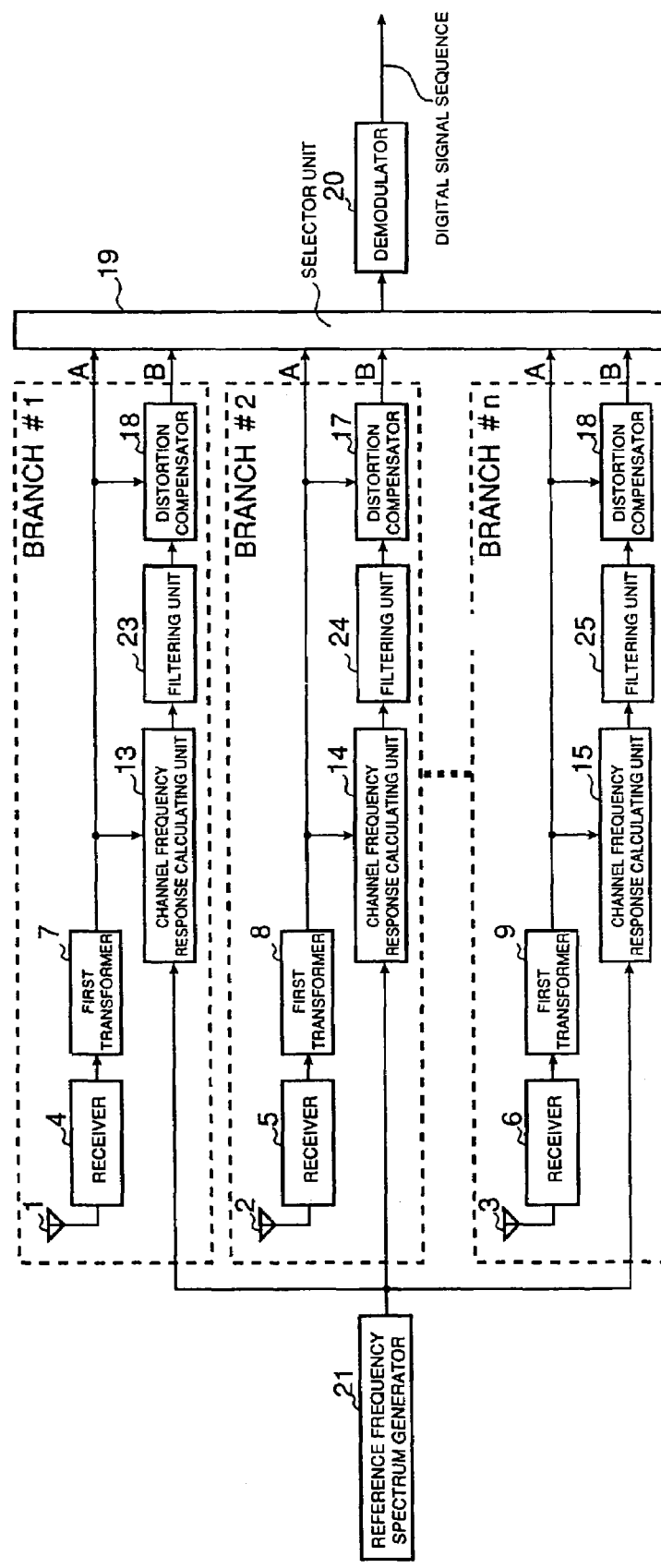
FIG. 9 is a block diagram illustrating an OFDM diversity receiving apparatus according to a seventh embodiment of the present invention.

FIG. 9 is a block diagram illustrating an OFDM diversity receiving apparatus according to a seventh embodiment of the present invention. In this embodiment, filtering units 23 through 25 are added to the second embodiment shown in FIG. 4 for removing distortions, such as noise, from channel responses. More specifically, the filtering units 23 through 25 are respectively interposed between the channel frequency response calculating units 13 through 15 and the distortion compensators 16 through 18.

In the branches #1 through #n of this embodiment, the OFDM received signal frequency spectra are calculated in the first transformers 7 through 9 in a manner similar to the first embodiment. The channel frequency response calculating units 13 through 15 then calculate the channel frequency responses inherent in the branches #1 through #n by using the OFDM received signal frequency spectra and the reference frequency spectrum generated in the reference frequency spectrum generator 21. Subsequently, the channel frequency responses are respectively input into the filtering units 23 through 25 in which distortions, such as noise, generated in the receivers 4 through 6 are removed from the channel frequency responses. The distortion-free channel frequency responses are then input into the distortion compensators 16 through 18, which respectively compensates for the distortions included in the OFDM received signal frequency spectra output from the first transformers 7 through 9 by using the filtered channel frequency responses.

The OFDM received signal frequency spectra generated in the first transformers 7 through 9 are input into the selector unit 19 as first input signals A, while the distortion-compensated OFDM received signal frequency spectra output from the distortion compensators 16 through 18 are input into the selector unit 19 as second input signals B. The selector unit 19 selects the branch in a manner similar to the counterpart of the first embodiment shown in FIG. 1, and outputs the distortion-compensated OFDM received signal frequency spectrum of the selected branch. The distortion-compensated OFDM received signal frequency spectrum is then input into the demodulator 20 and is demodulated into a digital signal sequence.

According to this embodiment, the filtering units 23 through 25 are respectively interposed between the channel frequency response calculating units 13 through 15 and the distortion compensators 16 through 18. With this arrangement, the channel frequency responses calculated in the branches #1 through #n can be formed more precise, thereby improving the receiving characteristics more effectively and accurately.

Although in this embodiment the filtering units 23 through 25 are added to the second embodiment illustrated in FIG. 4, filtering units may be added to the third embodiment or the fourth embodiment shown in FIG. 5 or 6. Additionally, in this embodiment, a single reference-frequency-spectrum generator 21 is shared among the branches #1 through #n. However, individual reference-frequency-spectrum generators may be provided for the respective branches #1 through #n, as in the first embodiment shown in FIG. 1.

Eighth Embodiment

Figure 10:
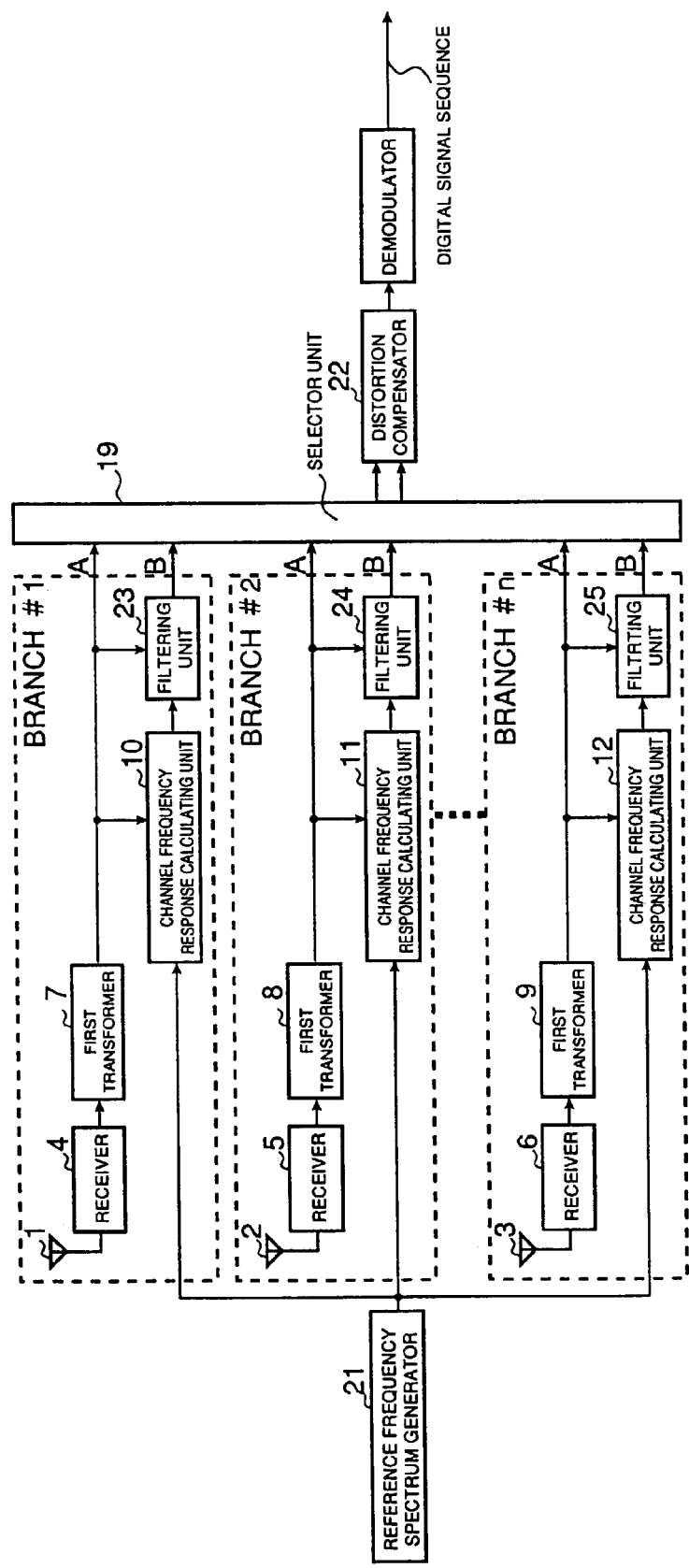
FIG. 10 is a block diagram illustrating an OFDM diversity receiving apparatus according to an eighth embodiment of the present invention.

FIG. 10 is a block diagram illustrating an OFDM diversity receiving apparatus according to an eighth embodiment of the present invention. In this embodiment, as well as in the seventh embodiment shown in FIG. 9, filtering units 23 through 25 are added to the fifth embodiment shown in FIG. 7 for eliminating distortions, such as noise, from the channel frequency responses. More specifically, the filtering units 23 through 25 are respectively inserted between the channel frequency response calculating units 13 through 15 and the selector unit 19.

In this embodiment, in the branches #1 through #n, OFDM received signal frequency spectra are calculated in the first transformers 7 through 9 in a manner similar to the first embodiment shown in FIG. 1. The channel frequency response calculating units 13 through 15 respectively calculate the channel frequency responses inherent in the branches #1 through #n by utilizing the OFDM received signal frequency spectra and the reference frequency spectrum generated in the reference frequency spectrum generator 21.

The channel frequency responses are then respectively input into the filtering units 23 through 25, in which distortions, such as noise, produced in the receivers 4 through 6 are removed. The OFDM received signal frequency spectra output from the first transformers 7 through 9 are input into the selector unit 19 as first input signals A, while the distortion-free channel frequency responses output from the filtering units 23 through 25 are input into the selector unit 19 as second input signals B. The selector unit 19 selects the branch in a manner similar to the counterpart of the fifth embodiment shown in FIG. 7, and outputs the OFDM received signal frequency spectrum and the distortion-free channel frequency response which are input from the selected branch.

The distortion compensator 22 compensates for the distortions of the OFDM received signal frequency spectrum output from the selector unit 19 by utilizing the channel frequency response output from the selector unit 19. The demodulator 20 then demodulates the distortion-compensated OFDM received signal frequency spectrum into a digital signal sequence.

According to the eighth embodiment, the filtering units 23 through 25 are inserted between the channel frequency response calculating units 13 through 15 and the selector unit 19. It is thus possible to form more precise channel frequency responses calculated in the branches #1 through #n, thereby improving the receiving characteristics more effectively.

Although in this embodiment the filtering units 23 through 25 are added to the fifth embodiment illustrated in FIG. 7, filtering units may be added to the sixth embodiment shown in FIG. 8. Additionally, although a single reference-frequency-spectrum generator 21 is shared among the branches #1 through #n, individual reference-frequency-spectrum generators may be provided for the respective branches #1 through #n, as in the first embodiment shown in FIG. 1.

(Filtering Units)

Figure 11:
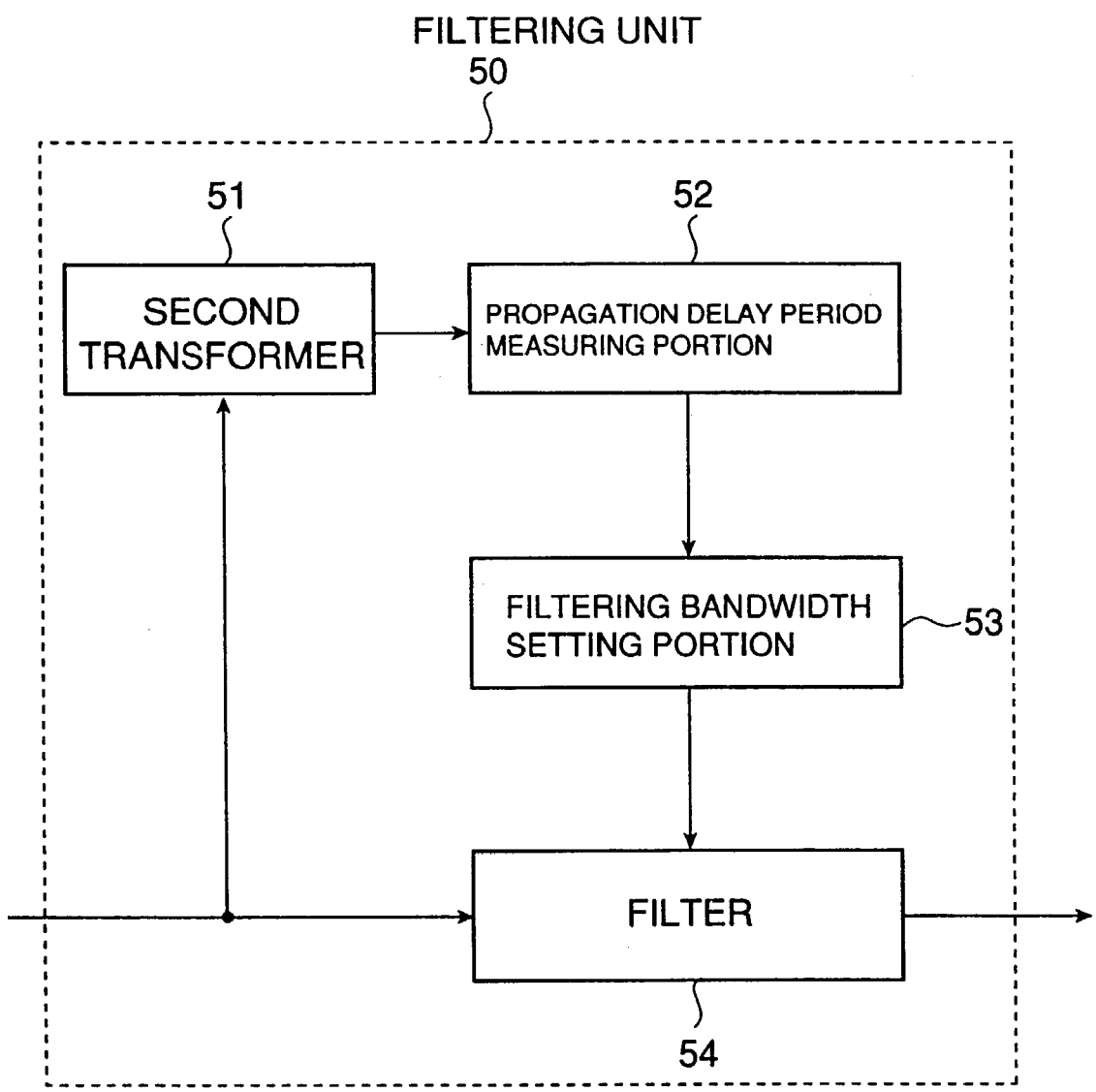
FIG. 11 is a block diagram illustrating a filter unit for use in an OFDM diversity receiving apparatus according to the present invention.

FIG. 11 illustrates an example of the configuration of the filtering units 23 through 25 used in the seventh embodiment or the eighth embodiment. Referring to FIG. 11, a filtering unit 50 represents one of the filtering units 23 through 25, which respectively serve as the subsequent stages of the channel frequency response calculating units 13 through 15 of the branches #1 through #n shown in FIG. 9 or 10. The filtering unit 50 is formed of a second transformer 51, a propagation delay period measuring portion 52, a filtering bandwidth setting portion 53, and a filter 54. The bandwidth of the filter 54 is variable.

The channel frequency response calculated in each of the branches #1 through #n is input into the second transformer 51 and the filter 54. The second transformer 51 transforms the input channel frequency response into time domain information, i.e., a channel impulse response, by performing transformation processing, such as inverse fast Fourier transform (IFFT). The channel impulse response is generally referred to as "delay profile", and represents the number of paths under a multiple radio propagation environment. The delay profile output from the second transformer 51 is then input into the propagation delay period measuring portion 52, in which the maximum delay period is measured from the delay profile. Based on the measured maximum delay period, the bandwidth of the filter 54 is determined in the filtering bandwidth setting portion 53. The channel frequency response is then filtered by the filter 54.

According to the filtering unit 50 configured as described above, distortions, such as noise, contained in the channel frequency responses can be efficiently eliminated even under a propagation environment in which the delay period varies. This makes it possible to determine the channel frequency responses more accurately, thereby improving the receiving characteristics.

The operation of the second transformer 51 of the filtering unit 50 shown in FIG. 11 is discussed in detail below with reference to FIGS. 12A and 12B. FIG. 12A illustrates an example of a channel frequency response calculated in each of the channel frequency response calculating units 13 through 15 of each branch under a 2-ray environment model having a desired path signal and an undesired path signal. Under a multipath propagation environment, frequency selective fading occurs, and the distortions caused by the frequency selective fading vary with a specific period in a frequency domain. Thus, the second transformer 51 transforms the channel frequency response into time domain information, resulting in a delay profile, such as the one shown in FIG. 12B. Accordingly, the radio propagation environment can be assessed. It is thus possible to set a filtering bandwidth such that a desired path signal and an undesired path signal are included in a signal pass band and the other components are blocked.

In this manner, the filtering bandwidth setting portion 53 first sets the filtering bandwidth of the filter 54. With the determined bandwidth, the filter 54 filters the channel frequency response. The filtering unit 50 thus passes only the required components and blocks the unnecessary components, thereby making it possible to calculate channel frequency responses more accurately.

Ninth Embodiment

Figure 13:
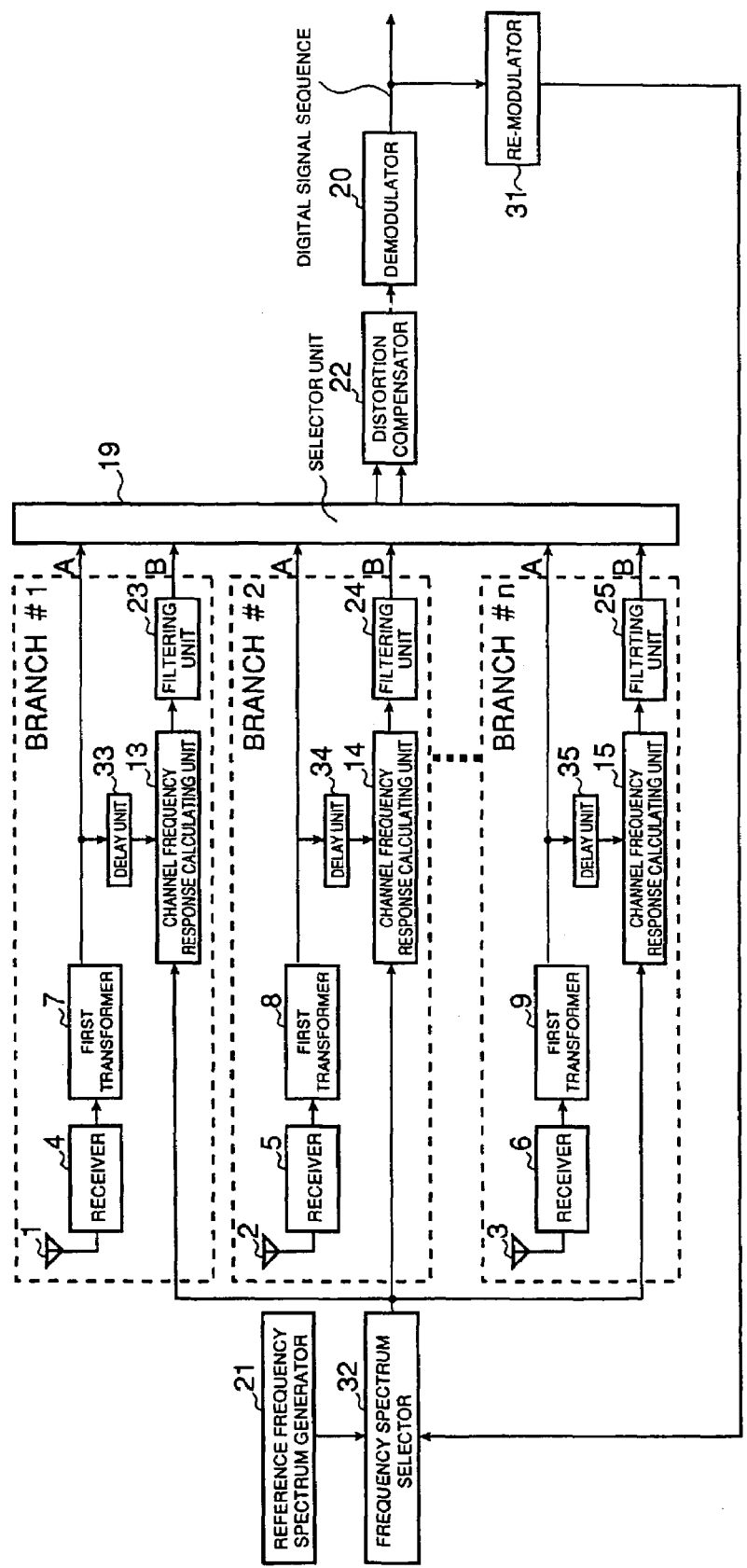
FIG. 13 is a block diagram illustrating an OFDM diversity receiving apparatus according to a ninth embodiment of the present invention.

FIG. 13 is a block diagram illustrating an OFDM diversity receiving apparatus according to a ninth embodiment of the present invention. The ninth embodiment is configured in a manner similar to the eighth embodiment shown in FIG. 10, except that the following elements are added. A re-modulator 31 re-modulates a digital signal sequence output from the demodulator 20 so as to generate a re-modulated frequency spectrum. A frequency spectrum selector 32 selects from the re-modulated frequency spectrum output from the re-modulator 31 and the reference frequency spectrum output from the reference frequency spectrum generator 21. Delay units 33 through 35 are also added.

More specifically, according to the OFDM diversity receiving apparatus of this embodiment, in the branches #1 through #n, the OFDM signals received by the receiving antennas 1 through 3 are respectively input into the receivers 4 through 6, and are converted into baseband signals from which guard intervals are removed. The baseband signals are further input into the first transformers 7 through 9 and are transformed into OFDM received signal frequency spectra by performing transformation processing, such as FFT.

In a communication system or a broadcasting system in which digital signal sequences are transmitted according to an OFDM transmission method using a slot, it is now assumed that a known data sequence is included at the head of the slot. With this configuration, when an OFDM signal having such a known data sequence is received, a reference frequency spectrum corresponding to the known data sequence is produced in the reference frequency spectrum generator 21 and is input into channel frequency response calculating units 13 through 15 of the respective branches #1 through #n via the frequency spectrum selector 32.

The outputs of the first transformers 7 through 9 of the branches #1 through #n are respectively input into the delay units 33 through 35, in which the OFDM received signal frequency spectra are delayed for a unit time (symbol time). The provision of the delay units 33 through 35 is for the purpose of synchronizing the OFDM received signal frequency spectra with a unit time delay generated by re-modulating the digital signal sequence in the re-modulator 31. If the channel frequency responses are calculated by using the reference frequency spectrum, the presence or the absence of the delay units 33 through 35 is negligible in effect.

The channel frequency responses are calculated in the channel frequency response calculating units 13 through 15 by using the OFDM received signal frequency spectra output from the first transformers 7 through 9 and the reference frequency spectrum output from the frequency spectrum selector 32 or the re-modulated frequency spectrum obtained by re-modulating the digital signal sequence by the re-modulator 31. The calculated channel frequency responses are respectively input into the filtering units 23 through 25, which then eliminate distortions included in the channel frequency responses and output the distortion-free channel frequency responses.

Figure 12:
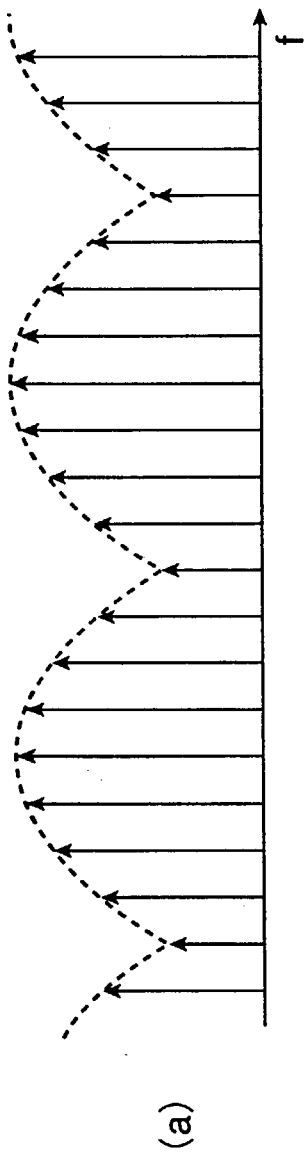
FIGS. 12A and 12B illustrate the operation of the filtering unit shown in FIG. 11.
Figure 12:
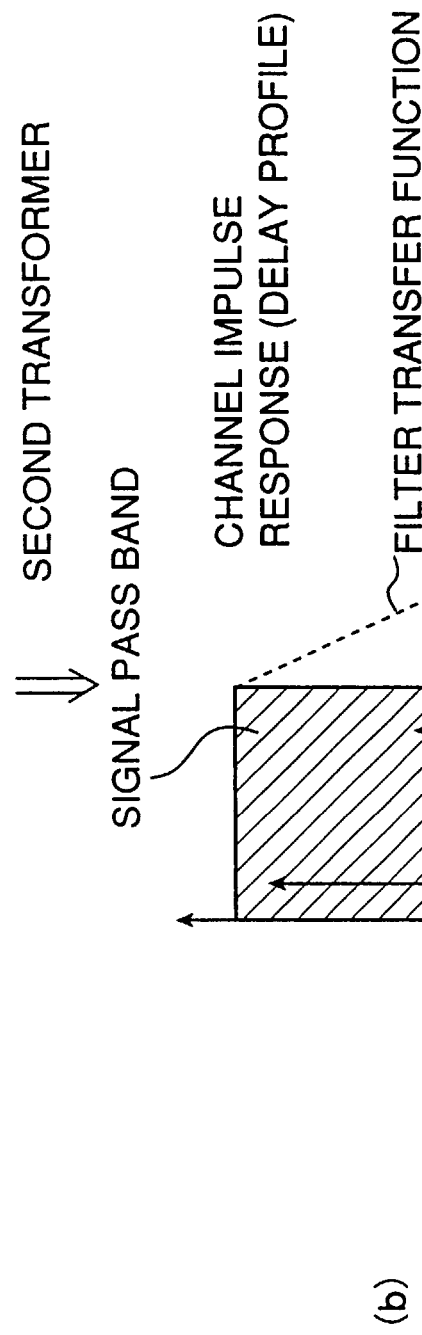

The operation of the filtering units 23 through 25 is similar to that performed by the filtering unit 50 discussed with reference to FIGS. 11 and 12. The OFDM received signal frequency spectra output from the first transformers 7 through 9 are input into the selector unit 19 as first input signals A, while the distortion-free channel frequency responses output from the filtering units 23 through 25 are input into the selector unit 19 as second input signals B.

The selector unit 19 compares the OFDM received signal frequency spectra, which serve as the first input signals A, generated in the branches #1 through #n, and selects the branch that has generated the OFDM received signal frequency spectrum having the maximum amplitude or the maximum power. The OFDM received signal frequency spectrum and the channel frequency response which are output from the selected branch are then input into the distortion compensator 22. The distortion compensator 22 then compensates for the distortions of the OFDM received signal frequency spectrum output from the selector unit 19 by using the channel frequency response output from the selector unit 19, and outputs the distortion-compensated OFDM received signal frequency spectrum. Subsequently, the demodulator 20 demodulates the frequency spectrum into a digital signal sequence.

As noted above, in a system which transmits digital signal sequences by using a slot containing a know data sequence at its head, the data sequences subsequent to the known data sequence are re-modulated in the re-modulator 31, then input into the frequency spectrum selector. The frequency spectrum selector selectively outputs the reference frequency spectrum or the re-modulated frequency spectrum to the channel frequency response calculating units 13 through 15 of the respective branches #1 through #n via the frequency spectrum selector 32. This processing is generally referred to as a "decision directed process" and is repeatedly performed. Namely, the channel frequency response is calculated from the frequency spectrum of the digital signal sequence demodulated at a time k and from the OFDM signal frequency spectrum received at a time k. The distortions contained in the output of the first transformers at a time k+1 are compensated for, based on the calculated channel frequency response.

According to the ninth embodiment, the updated channel frequency responses can be calculated in the respective branches #1 through #n even under a dynamic propagation environment, thereby enhancing the receiving characteristics.

Figure 14:
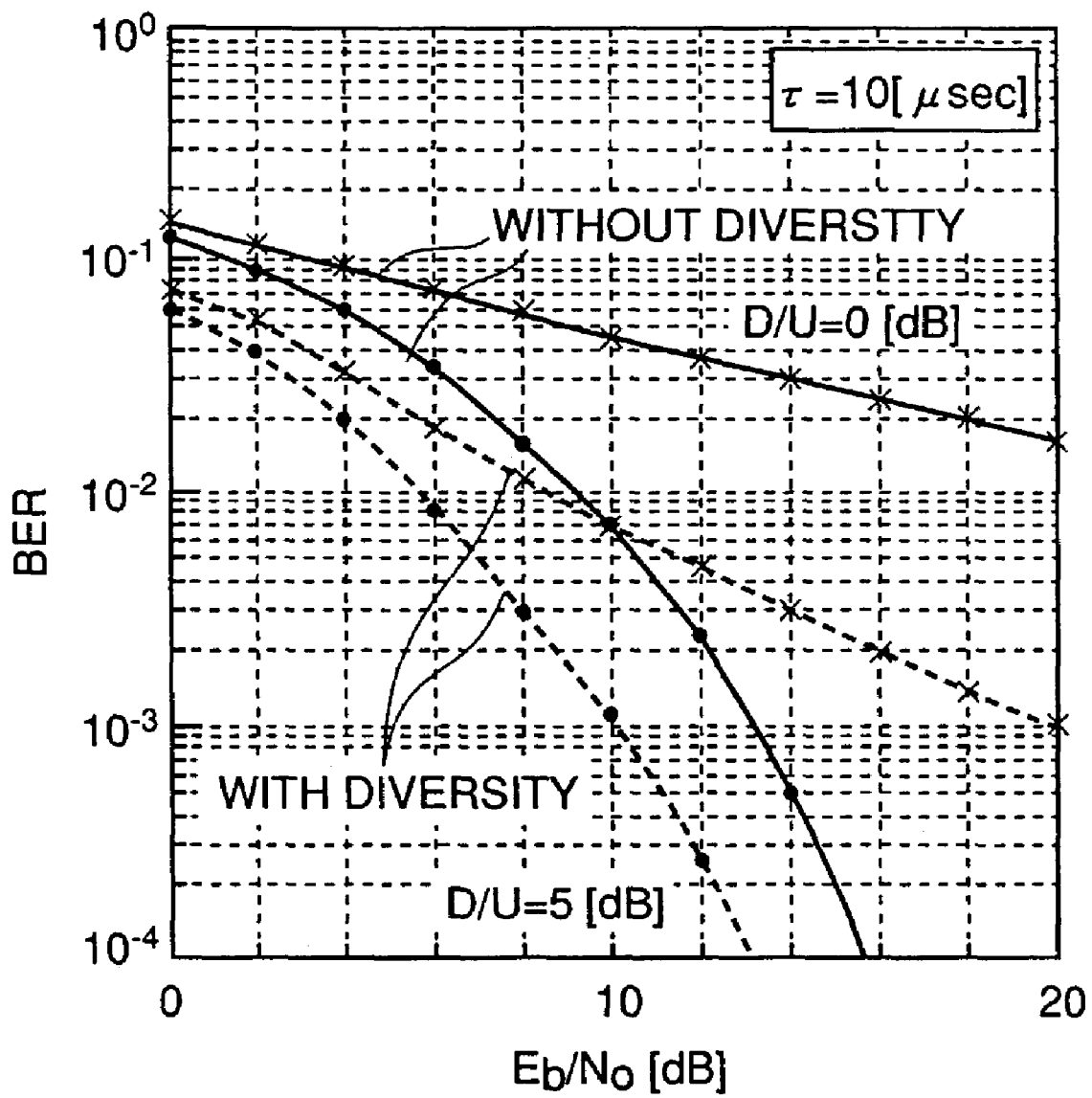
FIG. 14 is a diagram illustrating receiving characteristics of an OFDM diversity receiving apparatus according to the present invention.

FIG. 14 is a diagram illustrating the bit error rate performance, i.e., the receiving characteristics of the OFDM diversity receiving apparatus constructed in accordance with the ninth embodiment of the present invention shown in FIG. 13. In this diagram, the horizontal axis represents the ratio of bit energy to noise energy Eb/No(dB), while the vertical axis indicates the bit error rate (BER). The bit error rate performance has been obtained by using the QPSK modulation method under a 2-ray independent multipath propagation environment (fixed 2-ray propagation model). In the diagram, τ indicates a time difference between the appearances of the two rays (a desired path signal and an undesired path signal), and a D/U ratio represents a ratio of desired signal power to undesired signal power. In FIG. 14, the bit error rate performance is shown when the D/U ratio is 0(dB) and 5(dB). FIG. 14 reveals that regardless of the D/U ratio, the receiving characteristics of the diversity receiving apparatus of the present invention can be significantly improved over the known receiving apparatus without diversity.

In this embodiment, assuming that a receiving apparatus is moving, the re-modulator modulator 31, the frequency spectrum selector 32, and the delay units 33 through 35 are added to the eighth embodiment shown in FIG. 10. However, the above-described elements may be added to one of the first through sixth embodiments.

As is seen from the foregoing detailed description, the present invention offers the following advantages. The diversity receiving operation is performed by selecting from a plurality of diversity branches the branch that has generated the OFDM received signal frequency spectrum or the channel frequency response having the maximum power or the maximum amplitude. It is thus possible to inhibit the degradation of the receiving characteristics caused under a multiple reflection propagation environment.

What is claimed is:

1. A receiving apparatus comprising:
   a plurality of diversity branches, each of said diversity branches including a receiver for receiving an orthogonal frequency division multiplexing signal and outputting an orthogonal frequency division multiplexing received signal, a transformer for transforming the orthogonal frequency division multiplexing received signal into a orthogonal frequency division multiplexing received signal frequency spectrum and outputting the orthogonal frequency division multiplexing received signal frequency spectrum, and a channel frequency response calculating unit for calculating a channel frequency response in accordance with the orthogonal frequency division multiplexing received signal frequency spectrum and a reference frequency spectrum; and
   a selector unit for selecting the diversity branch that has generated the orthogonal frequency division multiplexing received signal frequency spectrum having a maximum amplitude or a maximum power.

2. A receiving apparatus comprising:
   a plurality of receivers, each of said receivers for receiving an orthogonal frequency division multiplexing signal and outputting an orthogonal frequency division multiplexing received signal;
   a plurality of transformers, each of said transformers for transforming the orthogonal frequency division multiplexing received signal from a corresponding one of the plurality of receivers into a orthogonal frequency division multiplexing received signal frequency spectrum;
   at least one reference frequency spectrum generator for generating a reference frequency spectrum relative to the orthogonal frequency division multiplexing received signal;
   a plurality of channel frequency response calculating units, each of said channel frequency response calculating units for calculating a channel frequency response in accordance with the frequency spectrum output from a corresponding one of the plurality of transformers and the reference frequency spectrum;
   a plurality of distortion compensators for compensating for a distortion of the frequency spectrum output from each of said transformers by using the corresponding channel frequency response;
   a selector unit for selecting, from among frequency spectra output from said transformer applied thereto as first input signals, the first input signals having a maximum amplitude or a maximum power, and from among distortion compensated frequency spectra output from said distortion compensators applied thereto as second input signals, the second input signals correspond to selected first input signals; and
   a demodulator for demodulating an output signal of said selector unit into a digital frequency response having a maximum amplitude or a maximum power.

3. A receiving apparatus according to claim 2, further comprising a filtering unit disposed between each of said channel frequency response calculating units and said distortion compensators, for filtering the channel frequency responses calculated by each of said channel frequency response calculating units.

4. A receiving apparatus according to claim 2, further comprising:
   a re-modulator for re-modulating the digital signal sequence demodulated by said demodulator and for generating a re-modulated frequency spectrum; and
   a frequency spectrum selector for selectively outputting the re-modulated frequency spectrum or the reference frequency spectrum to said channel frequency response calculating units.

5. A receiving apparatus according to claim 2, wherein said selector unit comprises a plurality of synthesizers for synthesizing amplitudes or power of line spectra forming the first input signals, and a comparator for comparing outputs of said synthesizers, thereby performing a selecting operation based on a comparison result of said comparator.

6. A receiving apparatus according to claim 2, wherein said selector unit comprises a comparator for comparing, among line spectra forming the first input signals, amplitude or power of line spectra of the same frequency, thereby performing a selecting operation based on a comparison result of said comparator.

7. A receiving apparatus comprising:
   a plurality of receivers, each of said receivers for receiving an orthogonal frequency division multiplexing signal outputting an orthogonal frequency division multiplexing received signal;
   a plurality of transformers, each of said transformers for transforming the orthogonal frequency division multiplexing received signal from a corresponding one of the plurality of receivers into a orthogonal frequency division multiplexing received signal frequency spectrum;
   at least one reference frequency spectrum generator for generating a reference frequency spectrum relative to the orthogonal frequency division multiplexing received signal;
   a plurality of channel frequency response calculating units, each of said channel frequency response calculating units for calculating a channel frequency response in accordance with the frequency spectrum output from each of said transformers and the reference frequency spectrum;
   a plurality of distortion compensators for compensating for a distortion of the frequency spectrum output from each of said transformers by using the corresponding channel frequency response;
   a selector unit for selecting and outputting, from among distortion-compensated frequency spectra outputs from said distortion compensators, the distortion-compensated frequency spectrum having a maximum amplitude or a maximum power; and
   a demodulator for demodulating an output signal of said selector unit into a digital signal sequence.

8. A receiving apparatus according to claim 7, further comprising a filtering unit disposed between each of said channel frequency response calculating units and said distortion compensators, for filtering channel frequency responses calculated by each of said channel frequency response calculating units.

9. A receiving apparatus according to claim 7, further comprising:
   a re-modulator for re-modulating the digital signal sequence demodulated by said demodulator and for generating a re-modulated frequency spectrum; and a frequency spectrum selector for selectively outputting the re-modulated frequency spectrum or the reference frequency spectrum to said channel frequency response calculating units.

10. A receiving apparatus according to claim 7, wherein said selector unit comprises a plurality of synthesizers for synthesizing amplitudes or power of line spectra forming the first input signals, and a comparator for comparing outputs of said synthesizers, thereby performing a selecting operation based on a comparison result of said comparator.

11. A receiving apparatus according to claim 7, wherein said selector unit comprises a comparator for comparing, among line spectra forming the first input signals, amplitude or power of line spectra of the same frequency, thereby performing a selecting operation based on a comparison result of said comparator.

12. A receiving apparatus comprising:
a plurality of receivers, each of said receivers for receiving an orthogonal frequency division multiplexing signal outputting an orthogonal frequency division multiplexing received signal;
a plurality of transformers, each of said transformers for transforming the orthogonal frequency division multiplexing received signal from a corresponding one of the plurality of receivers into a orthogonal frequency division multiplexing received signal frequency spectrum;
at least one reference frequency spectrum generator for generating a reference frequency spectrum relative to the orthogonal frequency division multiplexing received signal;
a plurality of channel frequency response calculating units, each of said channel frequency response calculating units for calculating a channel frequency response in accordance with the frequency spectrum output from each of said transformers and the reference frequency spectrum;
a selector unit for selecting,in a case where frequency spectra output from said transformed are determined as first input signals and where channel frequency responses calculated by said channel frequency response calculating units are determined as second input signals, the first input signals having a maximum amplitude or a maximum power and the second input signals correspond to a selected first input signal, said selector unit for outputting the selected first input signal and a selected second input signal as a first output signal and a second output signal, respectively;
distortion compensators compensating for a distortion of the first output signal of said selector unit by using the second output signal of said selector unit; and
a demodulator for demodulating an output signal of said distortion compensators into a digital sequence.

13. A receiving apparatus according to claim 12, further comprising a filtering unit disposed between each of said channel frequency response calculating units and said selector unit, for filtering the channel frequency responses calculated by each of said channel frequency response calculating units.

14. A receiving apparatus according to claim 12, further comprising:
a re-modulator for re-modulating the digital signal sequence demodulated by said demodulator and for generating a re-modulated frequency spectrum; and
a frequency spectrum selector for selectively outputting the re-modulated frequency spectrum or the reference frequency spectrum to said channel frequency response calculating units.

15. A receiving apparatus according to claim 12, wherein said selector unit comprises a plurality of synthesizers for synthesizing amplitudes or power of line spectra forming the first input signals, and a comparator for comparing outputs of said synthesizers, thereby performing a selecting operation based on a comparison result of said comparator.

16. A receiving apparatus according to claim 12, wherein said selector unit comprises a comparator for comparing, among line spectra forming the first input signals, amplitude or power of line spectra of the same frequency, thereby performing a selecting operation based on a comparison result of said comparator.

17. A receiving apparatus comprising:
a plurality of receivers, each of said receivers for receiving an orthogonal frequency division multiplexing signal and outputting an orthogonal frequency division multiplexing receiving signal;
a plurality of transformers, each of said transformers for transforming the orthogonal frequency division multiplexing received signal from a corresponding one of the plurality receivers into a orthogonal frequency division multiplexing received signal frequency spectrum;
at least one reference frequency spectrum generator for generating a reference frequency spectrum relative to the orthogonal frequency division multiplexing received signal;
a plurality of channel frequency response calculating units, each of said channel frequency response calculating units for calculating a channel frequency response in accordance with the frequency spectrum output from each of said transformers and the reference frequency spectrum;
a selector unit for selecting, in a case where channel frequency response calculated by said channel frequency response calculating units are determined as first input signals and where frequency spectra output from said transformers are determined as second input signals, the first input signals having a maximum amplitude or a maximum power and the second input signals correspond to a selected first input signal, said selector unit for outputting the selected first input signal and a selected second input signal as a first output signal and a second output signal, respectively;
distortion compensators compensating for a distortion of the second output signal of said selector unit by using the first output signal or said selector unit; and
a demodulator for demodulating an output signal of said distortion compensators into a digital signal sequence.

18. A receiving apparatus according to claim 17, further comprising a filtering unit disposed between each of said channel frequency response calculating units and said selector unit, for filtering the channel frequency responses calculated by each of said channel frequency response calculating units.

19. A receiving apparatus according to claim 17, further comprising:
a re-modulator for re-modulating the digital signal sequence demodulated by said demodulator and for generating a re-modulated frequency spectrum; and
a frequency spectrum selector for selectively outputting the re-modulated frequency spectrum or the reference frequency spectrum to said channel frequency response calculating units.

20. A receiving apparatus according to claim 17, wherein said selector unit comprises a plurality of synthesizers for synthesizing amplitudes or power of line spectra forming the first input signals, and a comparator for comparing outputs of said synthesizers, thereby performing a selecting operation based on a comparison result of said comparator.

21. A receiving apparatus according to claim 17, wherein said selector unit comprises a comparator for comparing, among line spectra forming the first input signals, amplitude or power of line spectra of the same frequency, thereby performing a selecting operation based on a comparison result of said comparator.

22. A method for receiving a diversity signal for use in a radio communication system that uses an orthogonal frequency division multiplexing technique, said method comprising the steps of:
providing a plurality of diversity branches, each of said diversity branches including a receiver for receiving an orthogonal frequency division multiplexing signal via an antenna and outputting the orthogonal frequency division multiplexing received signal, a transformer for transforming the orthogonal frequency division multiplexing received signal into a frequency spectrum and outputting the orthogonal frequency division multiplexing received signal frequency spectrum, and a channel frequency response calculating unit for calculating a channel frequency response in accordance with the orthogonal frequency division multiplexing received signal frequency spectrum and a reference frequency spectrum; and
selecting the diversity branch that has generated the orthogonal frequency division multiplexing received signal frequency spectrum having a maximum amplitude or a maximum power.

23. A method for receiving a diversity signal for use in a radio communication system that uses an orthogonal frequency division multiplexing technique, said method comprising the step of:
receiving an orthogonal frequency division multiplexing signal via an antenna and outputting the orthogonal frequency division multiplexing received signal;
transforming the orthogonal frequency division multiplexing received signal into a frequency spectrum;
generating a reference frequency spectrum relative to the orthogonal frequency division multiplexing received signal;
calculating channel frequency responses in accordance with the frequency spectrum and the reference frequency spectrum;
compensating for distortion of the frequency spectrum by using the corresponding channel frequency responses;
selecting and outputting, in a case where frequency spectra are determined as first input signals and where distortion-compensated frequency spectra are determined as second input signals, and second input signals correspond to the first input signals having a maximum amplitude or a maximum power; and
demodulating an output signal of said selecting step into a digital signal sequence.

24. A method for receiving a diversity signal for use in a radio communication system that uses an orthogonal frequency division multiplexing technique, said method comprising the steps of:
receiving an orthogonal frequency division multiplexing signal via an antenna and outputting the orthogonal frequency division multiplexing received signal;
transforming the orthogonal frequency division multiplexing received signal into* a frequency spectrum;
generating a reference frequency spectrum relative to the orthogonal frequency division multiplexing received signal;
calculating channel frequency responses in accordance with the frequency spectrum and the reference frequency spectrum;
compensating for distortion of the frequency spectrum by using the corresponding channel frequency responses;
selecting and outputting, among distortion-compensated frequency spectra, distortion-compensated frequency spectrum having a maximum amplitude or a maximum power; and
demodulating an output signal of said selecting step into a digital signal sequence.

25. A method for receiving a diversity signal for use in a radio communication system that uses an orthogonal frequency division multiplexing technique, said method comprising the steps of:
receiving an orthogonal frequency division multiplexing signal via an antenna and outputting the orthogonal frequency division multiplexing receiving signal;
transforming the orthogonal frequency division multiplexing received signal into a frequency spectrum;
generating a reference frequency spectrum relative to the orthogonal frequency division multiplexing receiving signal;
calculating channel frequency responses in accordance with the frequency spectrum and the reference frequency spectrum;
selecting, in a case where frequency spectra are determined as first input signals and where the channel frequency responses are determined as second input signals, the first input signals having a maximum amplitude or a maximum power and the second input signals correspond to a selected first input signal, and outputting the selected first input signal and a selected second input signal as a first output signal and a second output signal respectively;
compensating for distortion of the first output signal by using the second output signal; and
demodulating an output signal of said compensating step into a digital signal sequence.

26. A method for receiving a diversity signal for use in a radio communication system that uses an orthogonal frequency division multiplexing technique, said method comprising the steps of:
receiving an orthogonal frequency division multiplexing signal via an antenna and outputting the orthogonal frequency division multiplexing received signal;
transforming the orthogonal frequency division multiplexing receiving signal into a frequency spectrum;
generating a reference frequency spectrum relative to the orthogonal frequency division multiplexing received signal;
calculating channel frequency responses in accordance with the frequency spectrum and the reference frequency spectrum;
selecting, in a case where the channel frequency responses are determined as first input signals and where frequency spectra are determined as second input signals, wherein the first input signals having a maximum amplitude or a maximum power and the second input signals correspond to a selected first input signal and a selected second input signal as a first output signal and a second output signal, respectively;
compensating for distortion of the second output signal by using the first output signal; and
demodulating an output signal of said compensating step into a digital signal sequence.

* * * * *

UNITED STATES PATENT AND TRADEMARK OFFICE
CERTIFICATE OF CORRECTION

| | |
|---|---|
| PATENT NO. | : 7,266,108 B2 |
| APPLICATION NO. | : 10/271546 |
| DATED | : September 4, 2007 |
| INVENTOR(S) | : Sato et al. |

It is certified that error appears in the above-identified patent and that said Letters Patent is hereby corrected as shown below:

\* Claim 12, column 23, line 37, change "selecting,in" to --selecting, in--.

\* Claim 12, column 23, line 38, change "transformed" to --transformers--.

Claim 24, column 25, line 64, change "into\* a" to --into a--.

Signed and Sealed this

Eighth Day of April, 2008

JON W. DUDAS
*Director of the United States Patent and Trademark Office*

Disclaimer 7,266,108—Kazumi Sato, Kanagawa-ken (JP); Minoru Namekata, Kanagawa-ken (JP). METHOD AND APPARATUS FOR RECEIVING DIVERSITY SIGNALS FOR USE IN OFDM RADIO COMMUNICATION SYSTEM. Patent dated Sep. 4, 2007, Disclaimer filed September 27, 2007, by the assignee, Kabushiki Kaisha Toshiba.

The term of this patent shall not extend beyond the expiration date of Pat. No. 6,628,638.

*(Official Gazette September 30, 2008)*